(12) United States Patent
Slav

(10) Patent No.: US 11,202,245 B2
(45) Date of Patent: Dec. 14, 2021

(54) NETWORK DEVICES

(71) Applicant: Cognian Technologies Ltd., North Ryde (AU)

(72) Inventor: Zinger Slav, North Ryde (AU)

(73) Assignee: COGNIAN TECHNOLOGIES LTD., North Ryde (AU)

( * ) Notice: Subject to any disclaimer, the term of this patent is extended or adjusted under 35 U.S.C. 154(b) by 0 days.

(21) Appl. No.: 16/323,476

(22) PCT Filed: Aug. 8, 2017

(86) PCT No.: PCT/AU2017/050833
§ 371 (c)(1),
(2) Date: Feb. 5, 2019

(87) PCT Pub. No.: WO2018/027264
PCT Pub. Date: Feb. 15, 2018

(65) Prior Publication Data
US 2019/0191357 A1     Jun. 20, 2019

Related U.S. Application Data

(60) Provisional application No. 62/372,081, filed on Aug. 8, 2016.

(51) Int. Cl.
| | |
|---|---|
| *H04W 40/32* | (2009.01) |
| *H04W 40/24* | (2009.01) |
| *H04L 12/413* | (2006.01) |
| *H04L 12/00* | (2006.01) |
| *H04W 12/0431* | (2021.01) |

(Continued)

(52) U.S. Cl.
CPC ............. *H04W 40/32* (2013.01); *H04L 12/00* (2013.01); *H04L 12/413* (2013.01); *H04W 12/0431* (2021.01); *H04W 40/244* (2013.01); *H04W 56/001* (2013.01); *H04W 72/0446* (2013.01); *H04L 45/22* (2013.01); *H04L 45/7453* (2013.01)

(58) Field of Classification Search
None
See application file for complete search history.

(56) References Cited

U.S. PATENT DOCUMENTS

| | | | | |
|---|---|---|---|---|
| 7,739,727 B2 * | 6/2010 | Syvanne | ............... | H04L 41/082 713/153 |
| 8,840,030 B2 * | 9/2014 | Kelley | ................. | G06K 7/0008 235/492 |

(Continued)

FOREIGN PATENT DOCUMENTS

| | | |
|---|---|---|
| AU | 2016204037 | 6/2016 |
| WO | WO-2014040135 A1 * | 3/2014 .......... H04W 40/246 |

OTHER PUBLICATIONS

International Search Report dated Oct. 23, 2017 for PCT/AU2017/050833.

*Primary Examiner* — Otis L Thompson, Jr.
(74) *Attorney, Agent, or Firm* — Jones Day

(57) ABSTRACT

The present disclosure is related to systems, methods, and processor readable media for distributing digital data over networks. Certain embodiments relate to systems, methods, and devices used within such networks where at least a substantial portion of the interconnected devices are capable of interacting with one or more neighbouring devices, and then to form such a time synchronous network using local network information.

16 Claims, 18 Drawing Sheets

(51) Int. Cl.
  *H04W 56/00*    (2009.01)
  *H04W 72/04*    (2009.01)
  *H04L 12/743*   (2013.01)
  *H04L 12/707*   (2013.01)

(56) References Cited

U.S. PATENT DOCUMENTS

| | | | |
|---|---|---|---|
| 9,179,475 B2* | 11/2015 | Koleszar | H04W 74/02 |
| 9,693,325 B1* | 6/2017 | Park | H04W 4/70 |
| 10,671,590 B2* | 6/2020 | Lindem, III | G06F 16/2329 |
| 2006/0077997 A1* | 4/2006 | Yamaguchi | H04W 74/02 |
| | | | 370/445 |
| 2014/0010108 A1* | 1/2014 | Tavildar | H04W 12/0013 |
| | | | 370/254 |
| 2014/0254575 A1 | 9/2014 | Venkatraman et al. | |
| 2015/0078197 A1* | 3/2015 | Ding | H04W 48/16 |
| | | | 370/254 |
| 2015/0256401 A1* | 9/2015 | Zinger | H04L 41/14 |
| | | | 370/401 |
| 2016/0191202 A1* | 6/2016 | Barrow | H04L 1/20 |
| | | | 375/226 |
| 2019/0028886 A1* | 1/2019 | Deixler | H04W 84/18 |
| 2019/0297589 A1* | 9/2019 | Boehlke | H04R 5/04 |
| 2020/0025629 A1* | 1/2020 | Zinger | G06F 16/288 |
| 2020/0300835 A1* | 9/2020 | Lin | C12N 5/0619 |

* cited by examiner

Occupied channels and timeslots as seen by the device

NETWORK DEVICES

CROSS REFERENCE TO RELATED APPLICATION

This application is the National Phase application of International Application No. PCT/US2017/050833, filed Aug. 8, 2017, which designates the United States and was published in English, and which claims priority to U.S. Provisional Application No. 62/372,081, filed on Aug. 8, 2016. These applications are herein incorporated by reference in their entirety.

FIELD

The present disclosure relate generally to networks. Certain embodiments relate to systems, methods and/or devices used within such networks wherein at least a substantial portion of a plurality of devices are capable of interacting with one or more neighboring devices from the plurality of devices to comprise such a network.

BACKGROUND

Networks are utilized in a number of application areas to route data and/or other information between devices/nodes within the network. For example, star topology networks are used in lighting applications to route data and/or other information between lights, switches and sensors. Some networks allow for substantially continuous connections by retransmitting messages from access point-to-device until a destination is reached and some networks allow for reconfigurations around interferences.

One approach is to create a wired set of access points that may form a tree, where the leaves are access points. Those routers typically have to be able to maintain high speed links to serve a variety of demanding bandwidth and low-latency applications (such as video). The access point then uses Wi-Fi, and/or BLE to communicate with the end-devices. This approach may be suitable for applications like the deployment of surveillance cameras, etc.

A different set of emerging applications involves the interconnection of predominantly static devices. Spaces that have this form of problem are, for example, lighting control, smart grid, home automation, building automation, networks of sensors and controllers and ad-hoc network applications.

The access point approaches known in the art are constrained by resource limitations. The number of devices that an access point may manage is limited. Wiring of the access points also increases the cost of end device connectivity.

Non time-synchronous mesh networks suffer from inability to have more than one, two or five hops for battery-powered devices. This limits applications where such mesh networks may be used.

Traditional time-synchronous mesh networks suffer from limited ability to provide reasonable number of hops and unable to mesh dense networks due to internal interference.

Traditionally wireless networks typically have at least one gateway, access point or router. This often leads to necessity to have specialized hardware and also provides a single point of failure and/or security attack.

Accordingly, systems, methods and/or devices for addressing these and other problems disclosed herein within wireless networks are desirable. The present disclosure is directed to overcome and/or ameliorate at least one of the disadvantages of the prior art as will become apparent from the discussion herein.

SUMMARY

Certain embodiments relate to a network system comprising a plurality of devices wherein a substantial portion of the plurality of devices are capable of transmitting data and/or receiving data; wherein the distance between devices allows communication between at least one device and at least one other device; and wherein at least a portion of the plurality of devices comprising the network system configure themselves based on local network information.

Certain embodiments relate to a network system comprising a plurality of devices wherein a substantial portion of the plurality of devices are capable of transmitting data and/or receiving data; wherein the distance between devices allows communication between at least one device and at least one other device; wherein the network has substantially no access points and substantially no routers; and wherein a substantial portion of the plurality of devices comprising the network system are synchronous in time.

Certain embodiments relate to a network system comprising a plurality of devices wherein a substantial portion of the plurality of devices are capable of transmitting data and/or receiving data; wherein the distance between devices allows communication between at least one device and at least one other device; and wherein the substantial portion of the plurality devices comprising the network are synchronous in time and the network is substantially internal interference free.

Certain embodiments relate to a network system comprising a plurality of devices wherein a substantial portion of the plurality of devices are capable of transmitting data and/or receiving data; wherein the distance between devices allows communication between at least one device and at least one other device; and wherein at least one device from a plurality of devices comprising the network system stores previous configurations and the network build up time is one or more of the following: less than 10 minutes, less than 5 minutes, less than 1 minute, less than 30 seconds, less than 10 seconds, less than 5 seconds, less than 1 second, less than 100 msec, less than 50 msec and less than 10 msec.

Certain embodiments relate to a network system comprising a plurality of devices wherein a substantial portion of the plurality of devices are capable of transmitting data and/or receiving data; wherein the distance between devices allows communication between at least one device and at least one other device; wherein the number of devices comprising the network is N; and wherein at least one device from a plurality of devices comprising the network system stores previous configurations and the network build up time is one or more of the following: less than $100*N$ seconds, less than $50*N$ seconds, less than $10*N$ seconds, less than N seconds, less than $0.5*N$ seconds, less than $0.1*N$ seconds, less than $0.01*N$ seconds and less than $0.001*N$ seconds, where the symbol "*" represents multiplication function.

Certain embodiments relate to a network system comprising a plurality of devices wherein a substantial portion of the plurality of devices are capable of transmitting data and/or receiving data; wherein the distance between devices allows communication between at least one device and at least one other device; and wherein a substantial portion of a plurality of devices comprising adjacent networks may be synchronized in time.

Certain embodiments relate to a method for configuring at least a portion of the plurality of devices to comprise a network based on local network information; wherein a substantial portion of the plurality of devices are capable of transmitting data and/or receiving data; and wherein the distance between devices allows communication between at least one device and at least one other device;

Also disclosed are computer programming instructions adapted to cause a processing system to carry out these methods which may be embodied within a non-transitory computer readable storage medium.

As well as the embodiments discussed in the summary, other embodiments are disclosed in the specification, drawings and claims. The summary is not meant to cover each and every embodiment; combination or variations are contemplated with the present disclosure.

BRIEF DESCRIPTION OF FIGURES

These and other features, aspects, and advantages of the present disclosure will be better understood with regard to the following description, appended claims, and accompanying figures where:

DETAILED DESCRIPTION

Figure 1:
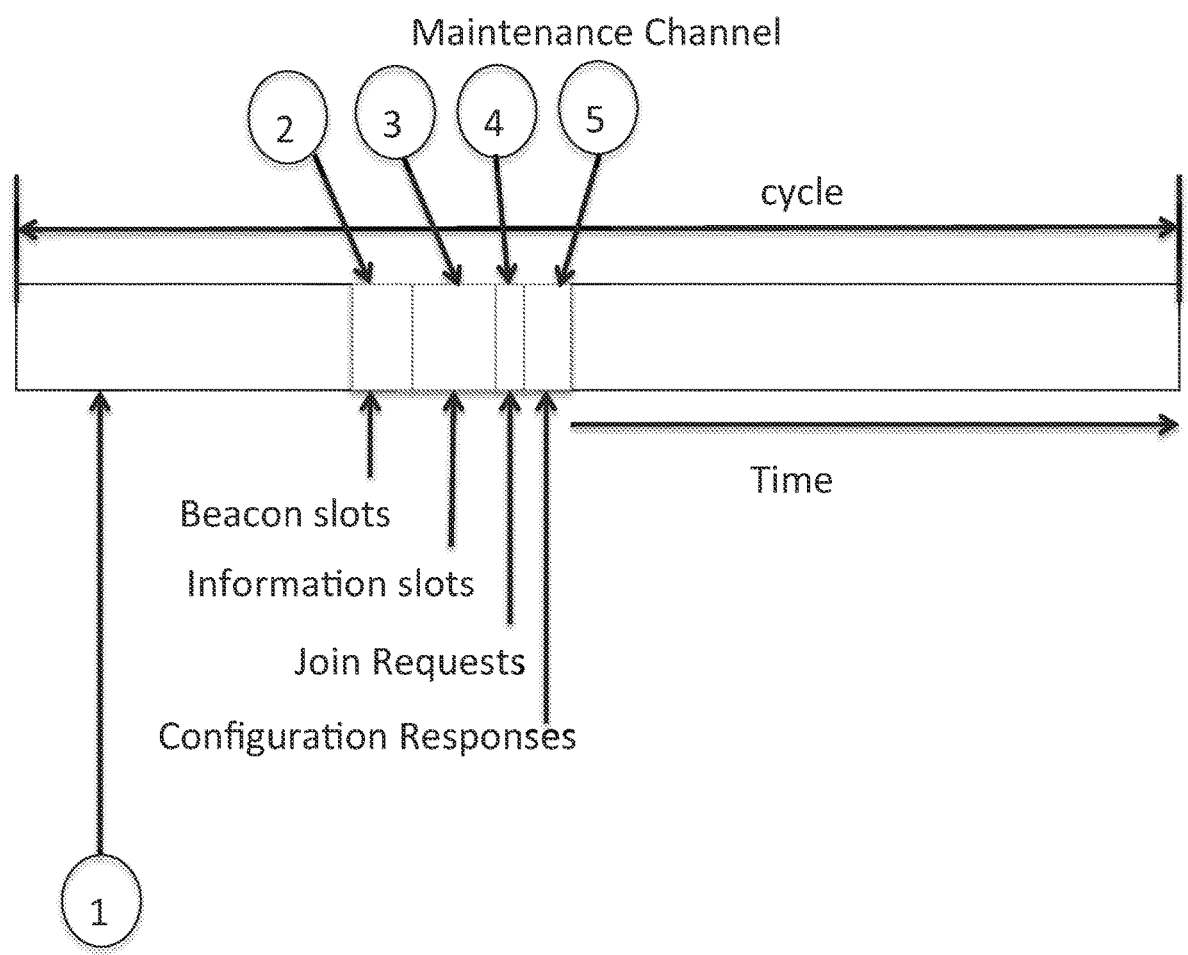
FIG. 1 illustrates exemplary embodiment of a maintenance channel with allocated time slots for transmission and reception of one or more of the following: beacons, network information, join requests and configuration responses.

The present disclosure is described in further detail with reference to one or more embodiments, some examples of which are illustrated in the accompanying drawings. The examples and embodiments are provided by way of explanation and are not to be taken as limiting to the scope of the disclosure. Furthermore, features illustrated or described as part of one embodiment may be used by themselves to provide other embodiments and features illustrated or described as part of one embodiment may be used with one or more other embodiments to provide further embodiments. The present disclosure covers these variations and embodiments as well as other variations and/or modifications.

The term "comprise" and its derivatives (e.g., comprises, comprising) as used in this specification is to be taken to be inclusive of features to which it refers, and is not meant to exclude the presence of additional features unless otherwise stated or implied.

Certain embodiments disclosed herein may be mesh networks, wireless networks, networks that have both wired devices/nodes and wireless devices/nodes. The networks may comprise devices wherein a substantial portion of the devices are wireless. The networks may comprise devices wherein a first portion of the devices are wireless and a second portion of the devices are wired.

As used herein, a substantial portion of a plurality of devices means 40% of the plurality of devices, 50% of the plurality of devices, 70% of the plurality of devices, 80% of the plurality of devices, 90% of the plurality of devices, 95% of the plurality of devices, 99% of the plurality of devices or 100% of the plurality of devices.

As used herein, a substantial portion of a plurality of devices means between 40% to 60% of the plurality of devices, between 50% to 70% of the plurality of devices, between 60% to 80% of the plurality of devices, between 70% to 90% of the plurality of devices, between 80% to 100% of the plurality of devices or between 90% to 100% of the plurality of devices.

As used herein, substantially no routers means that amount of routers in the network is one or more of the following: zero, one, two, between 0.001% to 0.01%, between 0.01% to 0.1% and between 0.1% to 1% of a plurality of devices comprising a network.

As used herein, substantially no access points means that amount of access points in the network is one or more of the following: zero, one, two, between 0.001% to 0.01%, between 0.01% to 0.1% and between 0.1% to 1% of a plurality of devices comprising a network.

As used herein, internal interference means that a first device of a plurality of devices comprising a network transmits data to a second device of the plurality of devices comprising the network and a third device of the plurality of devices comprising the network transmits data to a fourth device of the plurality of devices comprising the network; and distance between the first device of the plurality of devices comprising the network and the fourth device of the plurality of devices comprising the network allows communication between the first device of the plurality of devices comprising the network and the fourth device of the plurality of devices comprising the network; and the fourth device of the plurality of devices comprising the network fails to receive the data from the third device of the plurality of devices comprising the network due to jamming from the first device of the plurality of devices comprising the network.

As used herein, substantially internal interference free network means a plurality of devices comprising a network, wherein probability of interference from at least one device from the plurality of devices comprising the network is 0%, between 0% to 0.00001%, between 0.00001%, to 0.0001%, between 0.0001%, to 0.001% and between 0.001%, to 0.01%.

As used herein, network build up time means a time at which a number of devices comprising a network is at least 70%, 80%, 90%, 95% or 99% of a plurality of devices that may comprise the network.

Time Synchronization

As used herein, synchronize and/or synchronize in time and/or time synchronization means: at least two devices perform an action at substantially the same time and/or at least two devices reference substantially the same time.

As used herein, action means one or more of the following: interrupt, MPU instruction, turning receiver on, turning receiver off, turning transmitter on, turning transmitter on, turning oscillator on, turning oscillator off and another action.

As used herein, neighbors of a device from a plurality of devices means a portion or a substantial portion of devices from the plurality of devices wherein the distance between the device from the plurality of devices and the substantial portion of the portion or the substantial portion of devices from the plurality of devices allows communication between the device from the plurality of devices and the substantial portion of the portion or the substantial portion of devices from the plurality of devices.

In certain embodiments, substantially the same time may mean that time difference between at least two actions is no greater than 1 part per million (ppm), 5 ppm, 10 ppm, 20 ppm, 30 ppm, 50 ppm or 100 ppm.

In certain embodiments, substantially the same time may mean that time difference between at least two actions is between 1 to 5 ppm, 5 to 10 ppm, 10 to 20 ppm, 10 to 30 ppm, 20 to 50 ppm or 40 to 100 ppm.

In certain embodiments, substantially the same time may mean that time difference between at least two actions is no greater than 1 microsecond, 5 microseconds, 10 microseconds, 50 microseconds, 100 microseconds, 200 microseconds, 500 microseconds, 1 millisecond, 2 milliseconds, 5 milliseconds or 10 milliseconds.

In certain embodiments, substantially the same time may mean that time difference between at least two actions is between 1 to 5 microseconds, 5 to 10 microseconds, 10 to 50 microseconds, 50 to 100 microseconds, 50 to 200 microseconds, 100 to 500 microseconds, 500 microseconds to 1 millisecond, 1 to 2 milliseconds, 2 to 5 milliseconds or 5 to 10 milliseconds.

Certain embodiments disclosed herein may be directed to a plurality of devices comprising a mesh network, a wireless network or networks where a first portion of the devices are wired and a second portion of the devices are wireless, wherein a substantial portion of the plurality of devices are synchronized in time.

In certain embodiments, time synchronization may be achieved by one or more of the following means: by device listening on one or more RF channel(s) and adjusting it's clock based on one of the following: start of a frame, start of a synchronization sequence, reception of predefined number of symbols of the synchronization sequence, start of data, end of the frame, end of the synchronization frame and receiving predefined number of data symbols.

As used herein, adjacent networks means a plurality of devices comprising a first network and at least one second plurality of devices comprising at least one second network, wherein at least one device from the first network and at least one device from the at least one second network are within the distance that allows communication between the at least one device from the first network and the at least one device from the at least one second network.

In certain embodiments, a substantial portion of a plurality of devices comprising adjacent networks may be synchronized in time. At least one device from the plurality of devices comprising adjacent networks may be elected to act as clock master. Clock master devices may send messages at substantially regular intervals and those messages may be used by at least a portion of the plurality of devices comprising adjacent networks to synchronize their clocks.

In certain embodiments, a clock master election process may involve the following: at least one device from a plurality of devices comprising a network offers itself as clock master; at least one device from the plurality of devices comprising a network may fill in a voting packet by setting a bit corresponding to a network address of the at least one device from the plurality of devices comprising the network; the at least one device from the plurality of the devices comprising the network may vote for a new clock master if the at least one device from the plurality of devices comprising the network has not received one or more of the following packets originated by one or more of previous clock masters: a predefined number of consecutive packets, 50% of the predefined number of consecutive packets, 75% of the predefined number of consecutive packets, 90% of the predefined number of consecutive packets, between 50% to 75% of the predefined number of consecutive packets, between 60% to 90% of the predefined number of consecutive packets, between 80% to 100% of the predefined number of consecutive packets and a predefined number of packets within a predefined time interval.

Maintenance Channel and Beacons

In certain embodiments, a device from a plurality of devices comprising a second network may receive a beacon that may contain first network timing information from a device from a plurality of devices comprising a first network. The device from the plurality of devices comprising the second network may send the first network timing information to the second network clock master. The second network clock master may resynchronize the second network so that the second network is synchronized with the first network.

In certain embodiments, RF channel may mean one of more of the following: narrow band RF channel, wideband RF channel and ultra wide band RF channel. Other suitable RF channels may be used.

In certain embodiments, at least one device from a plurality of devices comprising a network may initiate data transmission based on one or more of the following: internal clock, crystal based clock, RC oscillator and external oscillator.

In certain embodiments, a device from a plurality of devices comprising a network may learn rate and direction of crystal drift for given temperature and may compensate for crystal drift. In other embodiments the device from the plurality of devices comprising the network may record one or more of the following: direction of the drift, rate of the drift and temperature.

In certain embodiments, a substantial portion of a plurality of devices comprising a network may use dedicated maintenance channel to transmit beacon information. The beacon information may contain one or more of the following: network identification, cycle number and time period length. Beacon information may be encrypted. The substantial portion of the plurality of devices comprising the network may be preconfigured with encryption and/or decryption key.

In certain embodiments, encryption and/or decryption keys may be loaded into a portion of a plurality of devices comprising a network using Public Key cryptography.

In certain embodiments, encryption and/or decryption keys may be loaded into a substantial portion of a plurality of devices comprising a network using Public Key cryptography.

In certain embodiments, substantial portion of a plurality of devices that may join a network may be preconfigured with encryption and/or decryption key.

In certain embodiments, encryption and/or decryption keys may be loaded into a portion of a plurality of devices that may join a network using Public Key cryptography.

In certain embodiments, encryption and/or decryption keys may be loaded into substantial portion of a plurality of devices that may join a network using Public Key cryptography.

In certain embodiments, a portion of a plurality of devices comprising a network may transmit beacon information on maintenance channel at predefined times and/or time interval.

In certain embodiments, number of devices from a plurality of devices comprising a network transmitting beacon information on maintenance channel may be at least 10%, 20%, 30%, 50%, 70%, 90% or 100% of the plurality of devices comprising the network.

In certain embodiments, beacon information may be sent as clear text and may be signed. Signing the network information may help to reduce the severity of denial of service (DoS) attacks. Signing the network information may be done by using AES-128, AES-256, AES-512 or any other block signing method.

In certain embodiments, a portion of a plurality of devices comprising a network transmitting beacon information on maintenance channel may transmit the beacon information at one or more of the following times: randomly selected time, prescribed time, randomly selected offset within a time slot, prescribed offset within a time slot, time derived by applying a mathematical formula and offset within a time slot derived by applying a mathematical formula.

In certain embodiments, maintenance channel may be CDMA sequence.

In certain embodiments, maintenance channel may be FDD sequence.

In certain embodiments, maintenance channel may be UWCDMA sequence.

In certain embodiments, RF channel may be CDMA sequence.

In certain embodiments, RF channel may be FDD sequence.

In certain embodiments, RF channel may be UWCDMA sequence.

In certain embodiments, maintenance channel may be shared with data channel.

In certain embodiments, maintenance channel may be multiple channels.

In certain embodiments, beacon information may be included in a data packet. A device from a plurality of devices that may join a network may retrieve beacon information by one or more of the following means: scanning at least one maintenance channel, scanning at least one data channel, scanning between 0 to 10% of available channels, scanning between 10% to 30% of available channels, scanning between 20% to 50% of available channels, scanning between 40% to 80% of available channels, scanning between 50% to 90% of available channels, scanning between 60% to 90% of available channels and scanning between 80% to 100% of available channels.

In certain embodiments, a device may store one or more of the following: all received beacon information, portion of received beacon information, substantial portion of received beacon information, all received beacon information from all devices from a plurality of devices comprising a network, all received beacon information from portion of devices from the plurality of devices comprising the network, portion of received beacon information from the portion of devices from the plurality of devices comprising the network and substantial portion of received beacon information from the portion of devices from the plurality of devices comprising the network FIG. 1 illustrates an exemplary embodiment of a maintenance channel with allocated time slots for transmission and reception of one or more of the following: beacons, network information, join requests and configuration responses. Time interval 1 may be comprised of at least one timeslot. Time interval 1 may be repeated in time. A substantial portion of a plurality of devices comprising a network may transmit beacons during time interval 2. In certain embodiments, a portion of the plurality of devices comprising the network may transmit local network information packet during time interval 3. In certain embodiments, a substantial portion of devices from a plurality of devices that may join a network may transmit join requests during time interval 4. In certain embodiments, at least one device from the plurality of devices comprising the network may respond to join requests during time interval 5.

Local Network Information

Certain embodiments are directed to a plurality of devices, wherein at least portion of the plurality of devices may comprise a network based on local network information. Local network information may contain one or more of the following: information about neighbors of at least one device from the plurality of devices and RF conditions around the at least one device from the plurality of devices and/or around neighbors of the at least one device from the plurality of devices. The local network information may be obtained by one or more of the following means: preprogrammed in a device from the plurality of devices, receiving beacon, receiving local network information packet, listening to RF channels and listening to at least one RF channel during at least one timeslot based on at least one received local network information packet.

In certain embodiments, local network information packet may contain information about occupied time-slots and signal strength (RSSI) at those time slots. In certain embodiments, local network information packet may also contain information about a configuration and repeat timeslots of a device from a plurality of devices comprising a network.

In certain embodiments, local network information packet may be transmitted by portion of a plurality of devices comprising a network.

In certain embodiments, a portion of a plurality of devices comprising a network transmitting local network information packet may be 10%, 20%, 40%, 60%, 80%, 90% and 100% of the devices from the plurality of devices comprising the network.

In certain embodiments, a portion of a plurality of devices comprising a network transmitting local network information packet may be between 10% to 20%, 20% to 40%, 40% to 60%, 60% to 80%, 70% to 90% and 80% to 100% of the devices from the plurality of devices comprising the network.

In certain embodiments, network information packet may be encrypted.

In certain embodiments, network information packet may be sent as clear text and signed.

In certain embodiments, network information packet may be transmitted with higher power than data packets.

Figure 2:
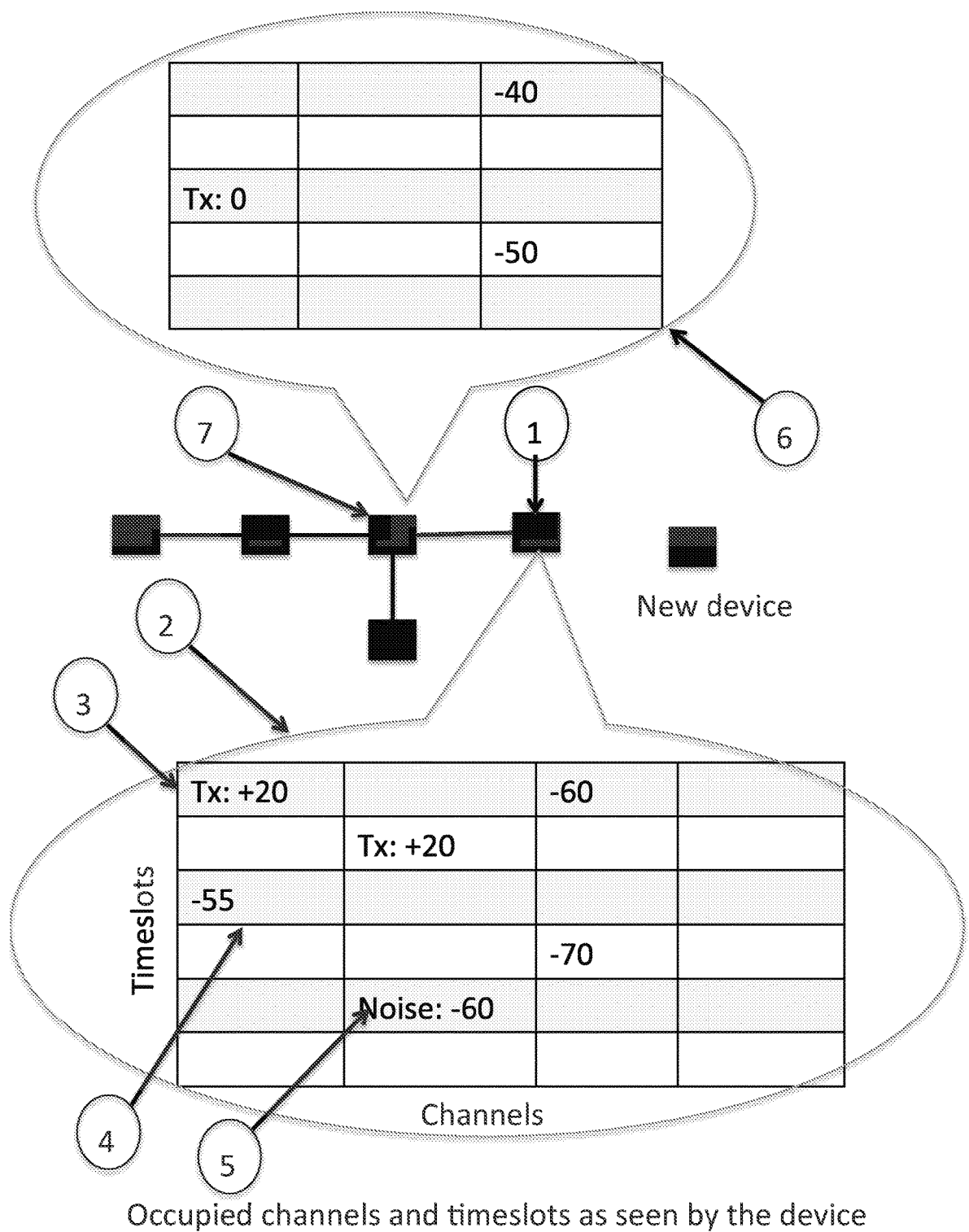
FIG. 2 illustrates exemplary embodiment of local network information.

FIG. 2 illustrates an exemplary embodiment of local network information 2 of a device 1 from a plurality of devices comprising a network that may contain one or more of the following: occupied time-slots 3 by the device 1 from the plurality of devices comprising the network, signal strength (RSSI) of occupied timeslots 4, noise level 5 of the timeslot. The exemplary local network information 2 of the device 1 from the plurality of devices comprising the network may be derived at least in part from an exemplary network information packet 6 received from device 7 from the plurality of devices comprising the network.

In certain embodiments, network information packet may also contain device number in the routed tree and/or number of children.

In certain embodiments, a device may scan a portion, a substantial portion or all of the frequency channels and update local network information.

Network Formation

Figure 3:
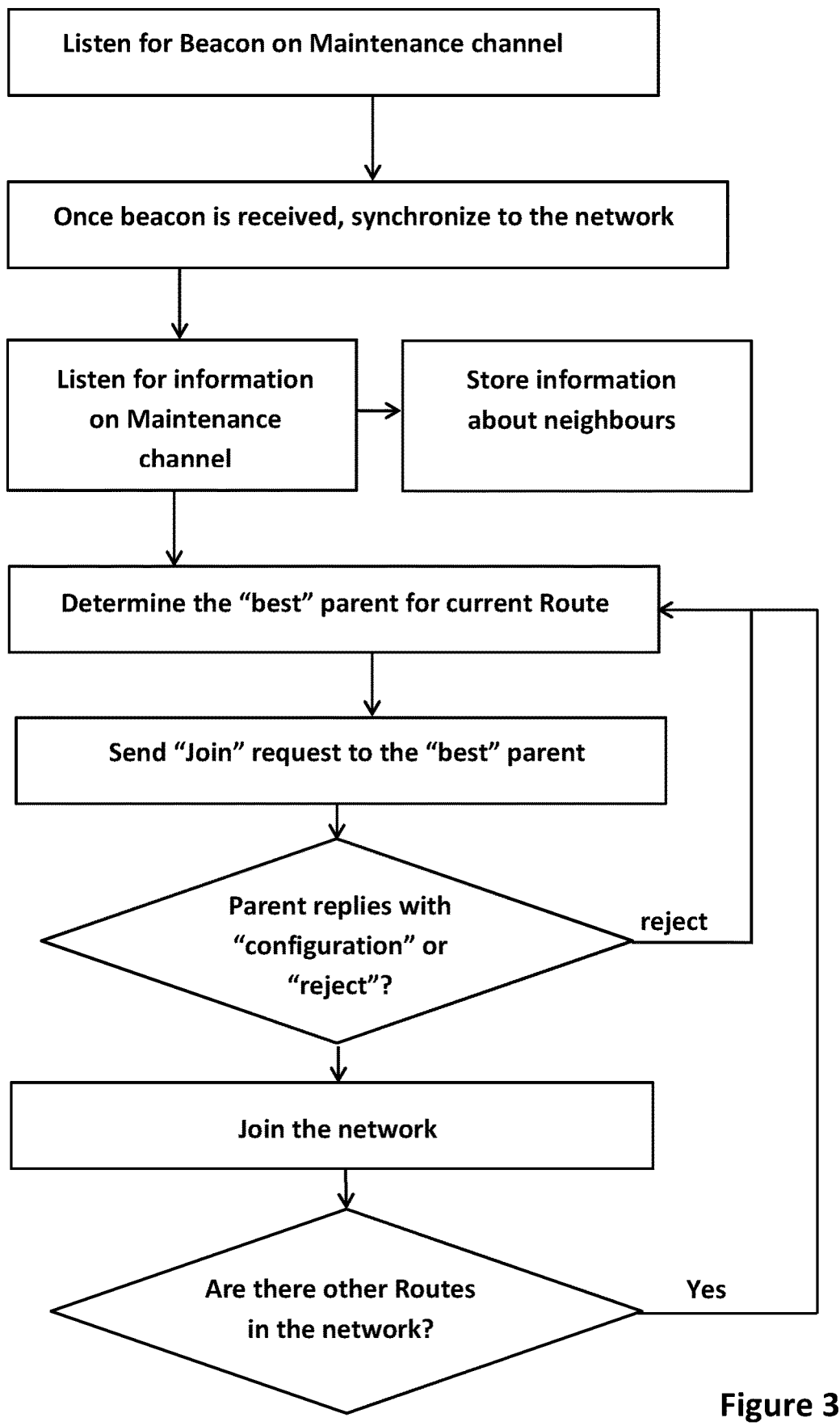
FIG. 3 illustrates exemplary embodiment of process of device joining a network.

FIG. 3 illustrates an exemplary embodiment of a process of device joining a network. Variations to the exemplary embodiment of the process of device joining a network are apparent to those skilled in the art.

In certain embodiments, a device that wants to join a network or a network route may select a device from a plurality of devices comprising the network by using one or more of the following criteria: randomly, highest RSSI, lowest number in the chain, power source and a number of children devices in a routed tree. The device that wants to join the network may send a join request to the device from the plurality of devices comprising the network.

In certain embodiments, the power source may be one or more of the following: AC power, battery power, solar power and power form energy harvesting.

In certain embodiments, a network route may be a path to deliver a message to or from a device.

In certain embodiments, a device from a plurality of devices comprising a network may have M network routes, wherein the device may have M links, M-1 links or M-N links, where N is between 1 to M/2, 1 to 3*M/4, 1 to M/3 and 1 to M/4, where the symbol "*" represents multiplication function.

Figure 4:
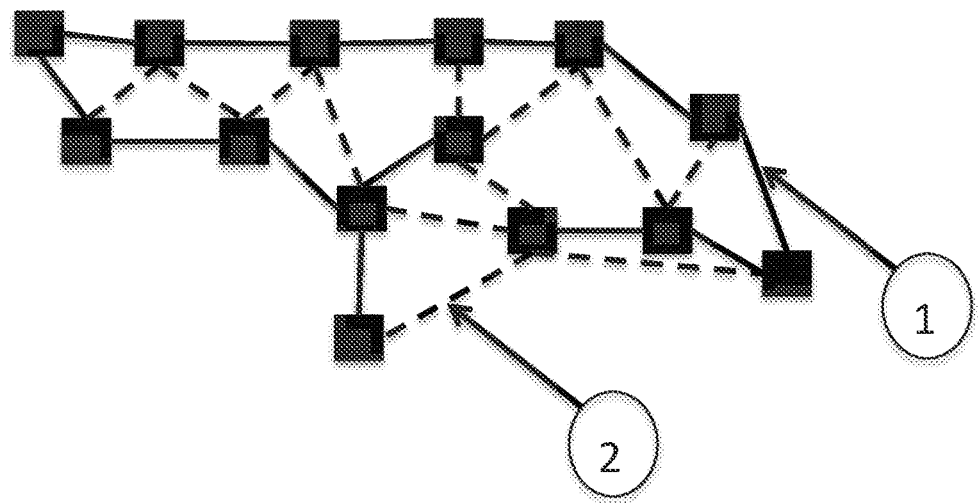
FIG. 4 depicts an exemplary embodiment of network with multiple routes.

FIG. 4 depicts an exemplary embodiment of a network with multiple routes. The depicted exemplary embodiment of the network contains route 1 and route 2. Multiple routes may include portion of devices comprising the network, substantial portion of devices comprising the network, and/or all devices comprising the network.

In certain embodiments, multiple routes may be used to reduce message error rate and/or packet error rate of a link to a device by at least a factor of between 1.01 to 1.5, 1.5 to 2, 1.8 to 2.5, 2 to 3, 2.5 to 3.5, 3 to 5 and 4 to 6.

In certain embodiments, multiple routes may be used to increase the probability of successfully delivering message to or from a device by at least factor of between 1.01 to 1.5, 1.5 to 2, 1.8 to 2.5, 2 to 3, 2.5 to 3.5, 3 to 5 and 4 to 6.

In certain embodiments, a device may be part of N routed trees within a network. The device may have M links and M may be less or equal than N.

Figure 5:
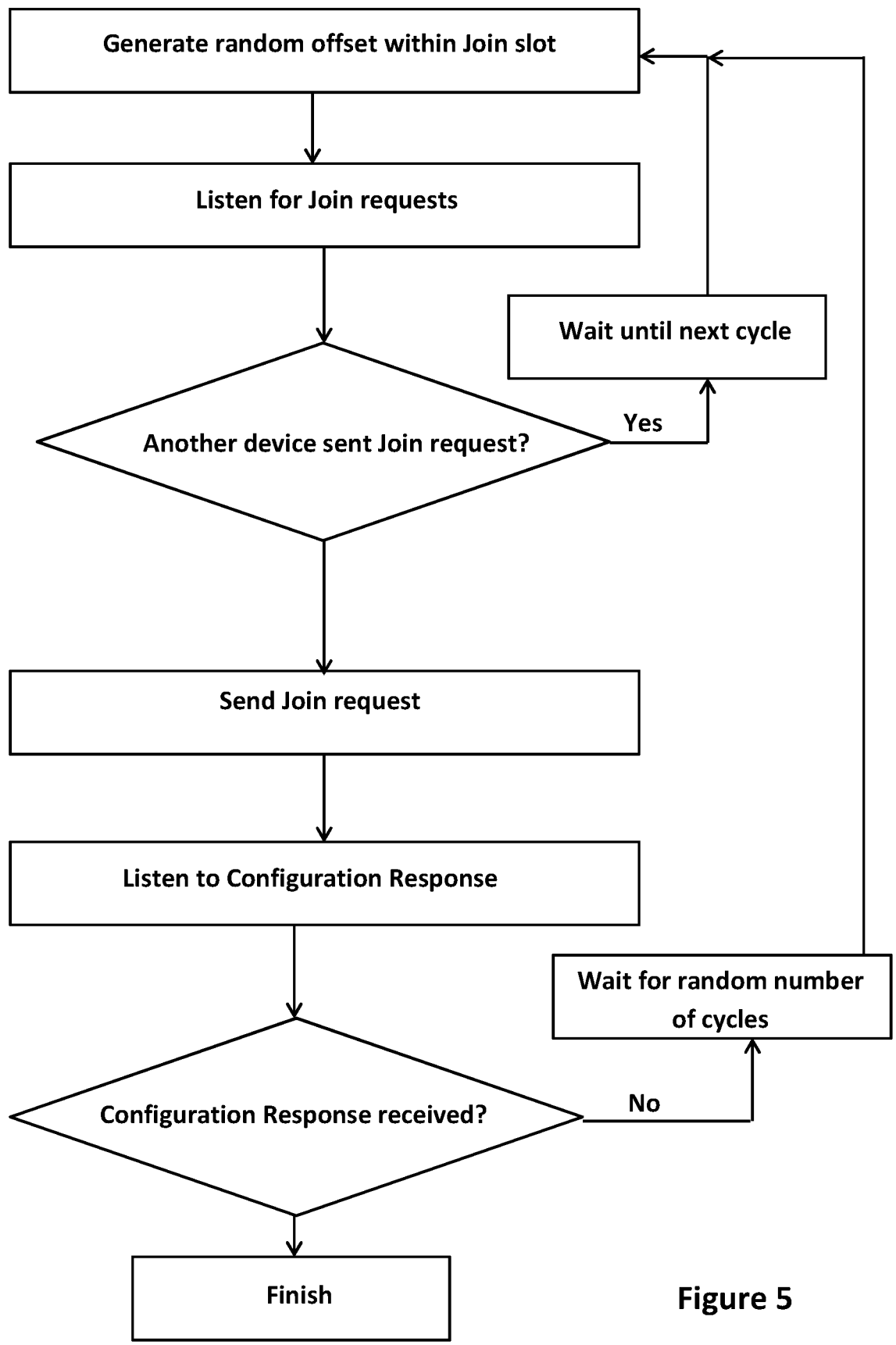
FIG. 5 depicts an exemplary embodiment of process of device sending a join request to join the network.

FIG. 5 depicts an exemplary embodiment of a process of device sending a join request to join a network.

In certain embodiments, if configuration response is not received, than a device may wait for one or more of the following before repeating join request process: random periods of time, substantially random periods of time, random number of cycles, substantially random number of cycles, predefined number of cycles or substantially predefined number of cycles.

Figure 6:
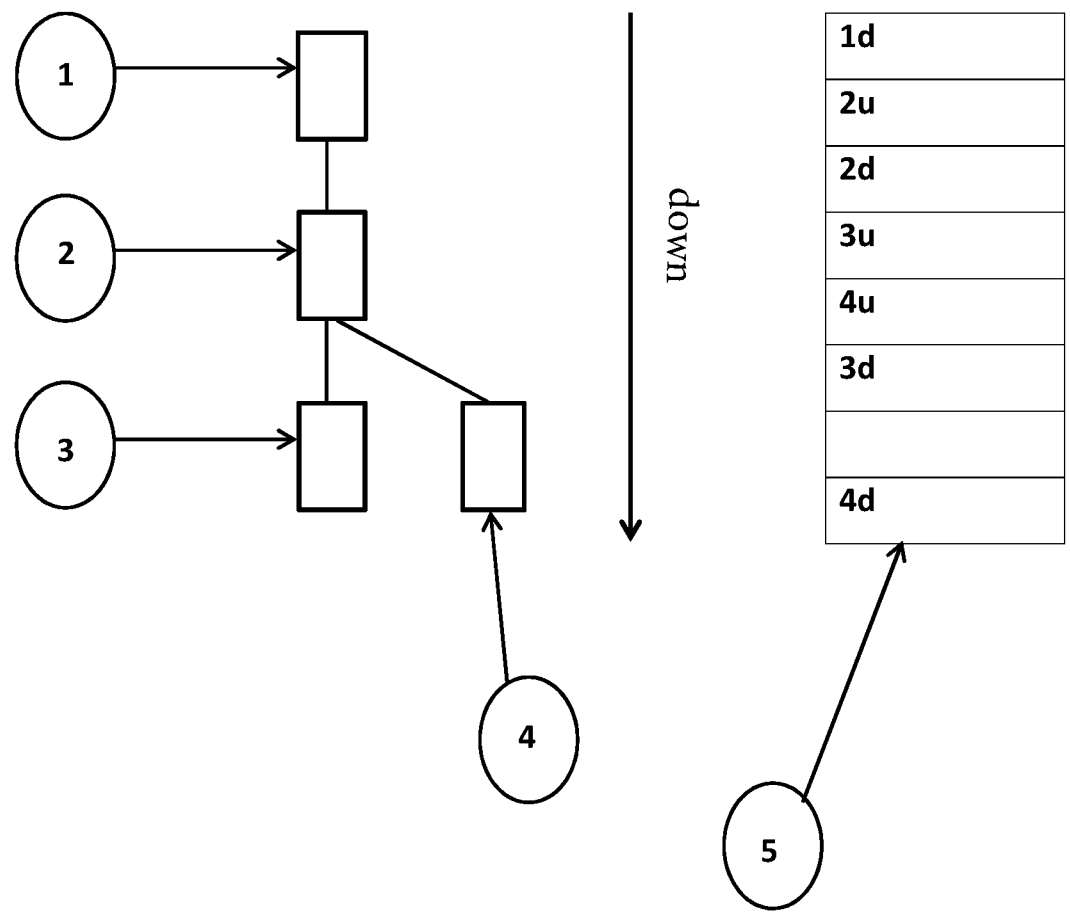
FIG. 6 illustrates an exemplary embodiment of network configuration after a substantial portion of devices has joined the network.

FIG. 6 illustrates an exemplary embodiment of a network configuration after a portion of a plurality of devices has formed the network. In the exemplary embodiment UP packet may include an acknowledgement for receiving DOWN packet. In the exemplary embodiment of the network configuration device 1 is a parent to device 2, device 2 is a parent to devices 3 and 4. The table numbered 5 in FIG. 6 depicts exemplary timeslot allocation of the portion of plurality of devices that formed the network.

In certain embodiments, DOWN and/or UP packet may be followed by an acknowledgement. In certain embodiments, the acknowledgement may be included in the next UP packet and/or the next DOWN packet. In certain embodiments, the acknowledgement may be transmitted within 100 usec, 200 usec, 500 usec, 1 msec and 2 msec after receiving UP and/or DOWN packet.

Figure 7:
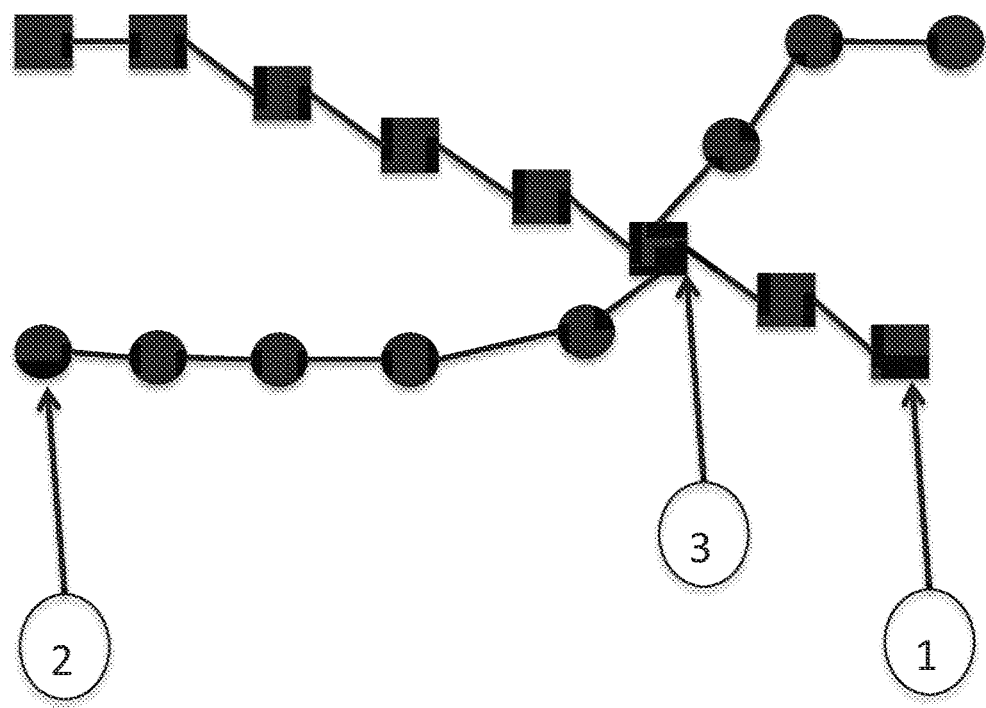
FIG. 7 depicts an exemplary embodiment of networks with relay.

In certain embodiments, device seeking to joint a first network may send a request to join the first network through a relay device residing on a second network. The relay device residing on the second network may join the first network for the purpose of being a relay for the device seeking to joint the first network. FIG. 7 depicts exemplary network 1 and network 2 with relay 3.

In certain embodiments, device capabilities may include one or more of the following: power source, battery size, receiver current consumption, transmitter current consumption and MPU current consumption.

In certain embodiments, device needs may include one or more of the following: device type, command size, response size, preferred time between commands and preferred time between responses.

In certain embodiments, join request may include one or more previous configurations. Cycle numbers may be used as timestamps for previous configurations.

In certain embodiments, join request may include spectrum analysis of the RF space. An example of the spectrum analysis may be one or more of the following: average noise in portion of channels, average noise in a substantial portion of channels, average noise in all channels, maximum noise in a portion of channels, maximum noise in substantial portion of channels and maximum noise in all channels.

In certain embodiments, join request may include one or more of the following information about a device that may join a network or network route: capabilities, needs, at least one previous configuration and spectrum analysis of the RF space.

In certain embodiments, information in the join request may be used by a device from the plurality of devices comprising a network, receiving the join request, to create the configuration for the device that may join a network. The join request may include capabilities and/or needs of the device that may join the network.

In certain embodiments, a device may discard a packet if between 90% to 100%, 80% to 100%, 60% to 90% and 50% to 80% of the information in the packet is substantially similar to information in at least one previously received packet, wherein the information in the packet may be identified as substantially similar by one or more of the following: comparing substantially entire message, comparing portion of the message, comparing message cryptographic signature, comparing portion of the message cryptographic signature and calculating hash function of the message and comparing it to hash functions of previous messages.

In certain embodiments, configuration response may contain network specific parameters. Network specific parameters may include one or more of the following: allow or disallow battery powered devices to send beacons, maximum number of children, minimum RSSI for parent selection, set of available channels and virtual to real channels mapping or function.

In certain embodiments, a device from a plurality of device comprising a network or a route that fails to receive a predefined number of substantially consecutive UP and/or DOWN packets may listen to beacons and resynchronize to the network or the route.

In certain embodiments, a portion or substantial portion of a plurality of devices comprising a network may store a configuration in FLASH and at least one device from the portion or substantial portion of the plurality of devices comprising the network may continue to use the configuration after the at least one device from the portion or substantial portion of the plurality of devices comprising the network is powered up and/or synchronized on the network after receiving a beacon.

Figure 13:
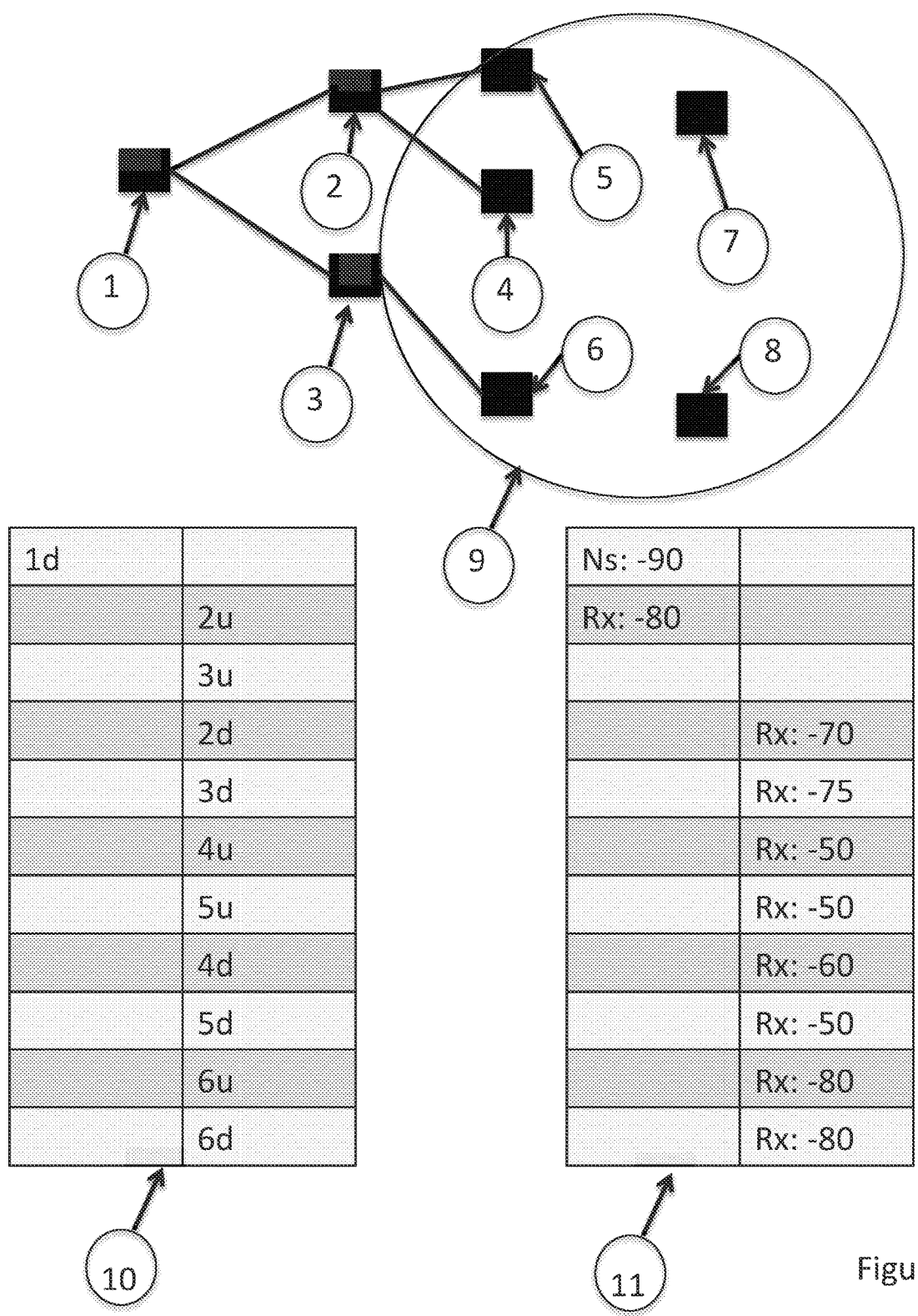
FIG. 13 depicts an exemplary embodiment of devices joining a network.

FIG. 13 depicts an exemplary embodiment of joining device 7 and device 8 to a network comprised of devices 1-6. Communication distance 9 of device 7 is shown as a circle. The table numbered 10 in FIG. 13 shows timeslot allocation within the exemplary embodiment. The table numbered 11 in FIG. 13 shows local network information of device 7.

Figure 14:
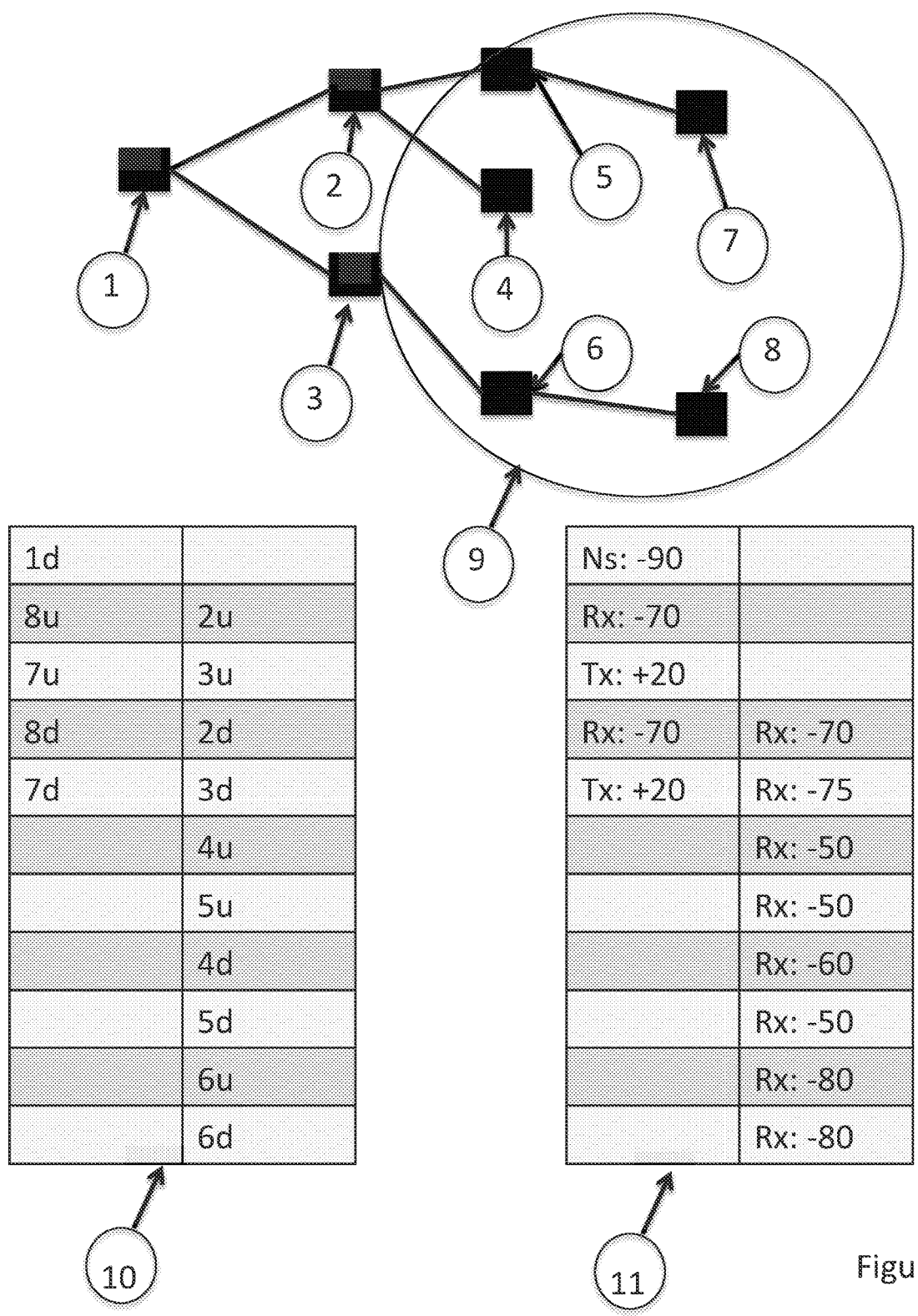
FIG. 14 depicts an exemplary embodiment of a plurality of devices comprising a network after devices joined the network.

FIG. 14 depicts an exemplary embodiment of a plurality of devices 1 to 8 comprising a network after device 7 and device 8 joined the network comprised of the plurality of devices 1 to 8. Communication distance 9 of device 7 is shown as a circle. The table numbered 10 in FIG. 14 shows timeslot allocation within the exemplary embodiment. The table numbered 11 in FIG. 14 shows local network information of device 7.

Data Handling

In certain embodiments, at least one device from a plurality of devices comprising a first network may be used to inject command into the first network from a second network or send a packet from the first network to the second network, wherein the second network may be wireless network, wired network and/or cloud based network.

Figure 8:
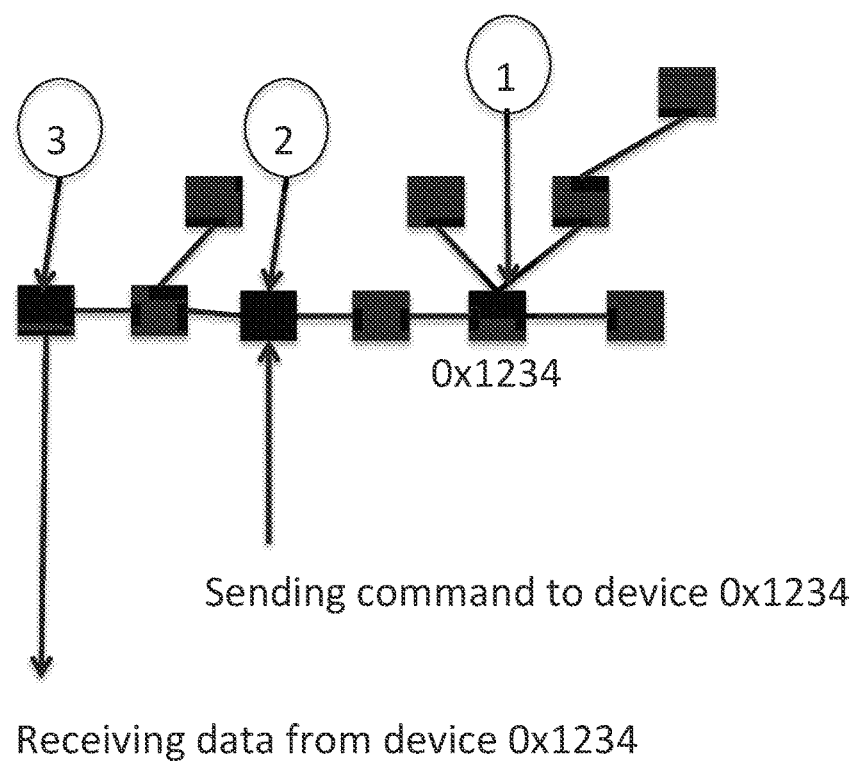
FIG. 8 depicts an exemplary embodiment showing data injected to and received from the network.

FIG. 8 depicts an exemplary embodiment showing data injected to and received from a network. In the exemplary embodiment, device 1 has an address 0x1234, command to device 1 is injected via device 2 and data from device 1 is received via device 3.

In certain embodiments, a device may have multiple group and/or application encryption and/or decryption keys. The device may decide which application the packet belongs to by successfully matching signature of the packet.

Figure 9:
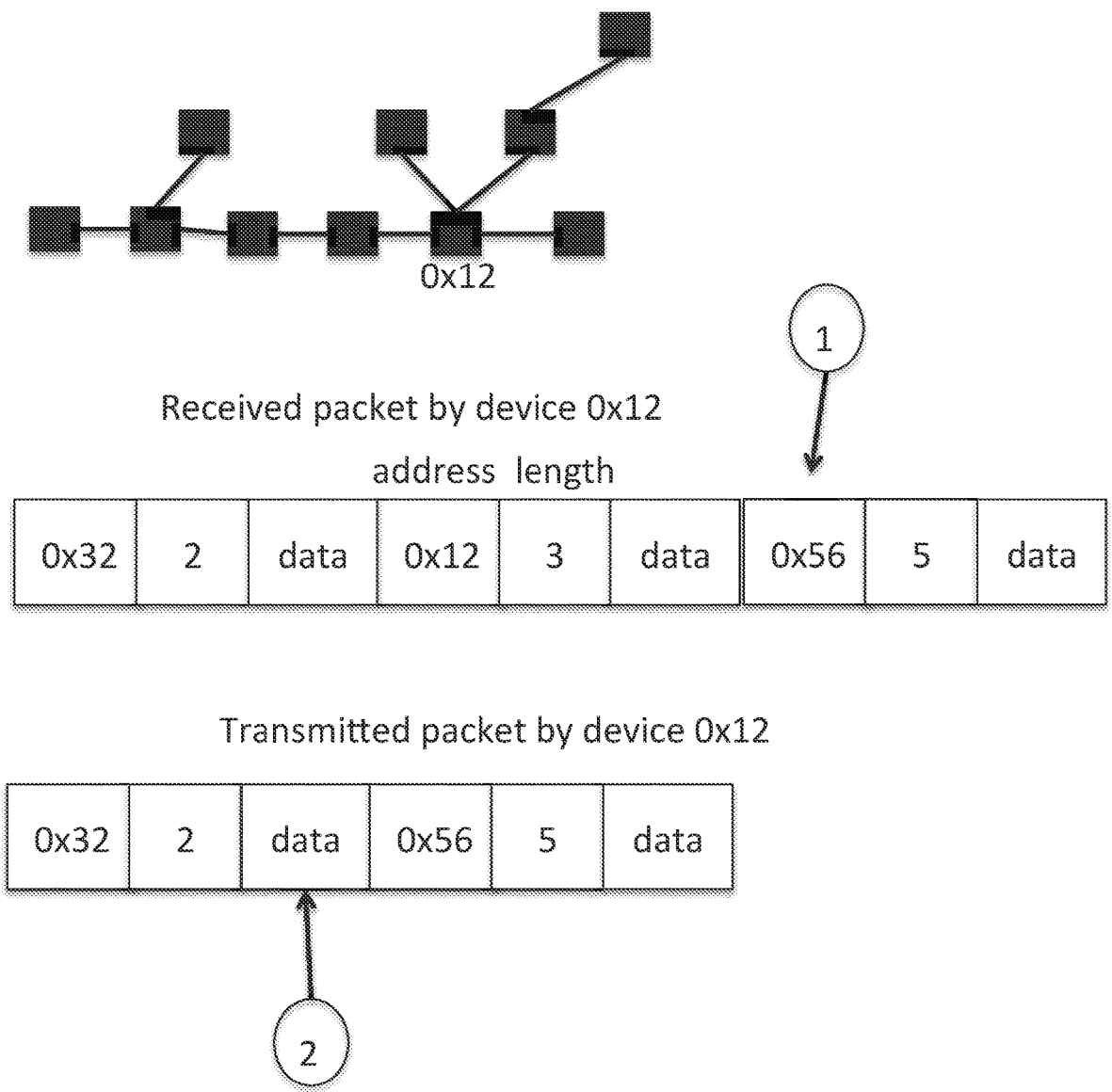
FIG. 9 illustrates an exemplary embodiment of packet before and after discarding the data.

In certain embodiments, if a packet is between 90% to 100%, 80% to 100% or 70% to 95% full and a device from a plurality of devices comprising a network has data to send, the device from the plurality of devices comprising the network may skip one or more packets. If one or more of the next packets is substantially full, than the device from the plurality of devices comprising the network may discard data or substantially portion of the data from another substantially random or substantially predefined device from the plurality of devices comprising the network and replace it with the data to send. FIG. 9 illustrates an exemplary embodiment of a packet before (1) and after (2) discarding the data.

In certain embodiments, a device may request additional repeat timeslots.

In certain embodiments, portion or substantial portion of a plurality of devices comprising a network may learn one or more of the following information: average data rates, minimum data rates and peak data rates. At least one device from the portion or substantial portion of the plurality of devices comprising the network may use the one or more of the above information to add or refuse to add more devices to the network.

Figure 10:
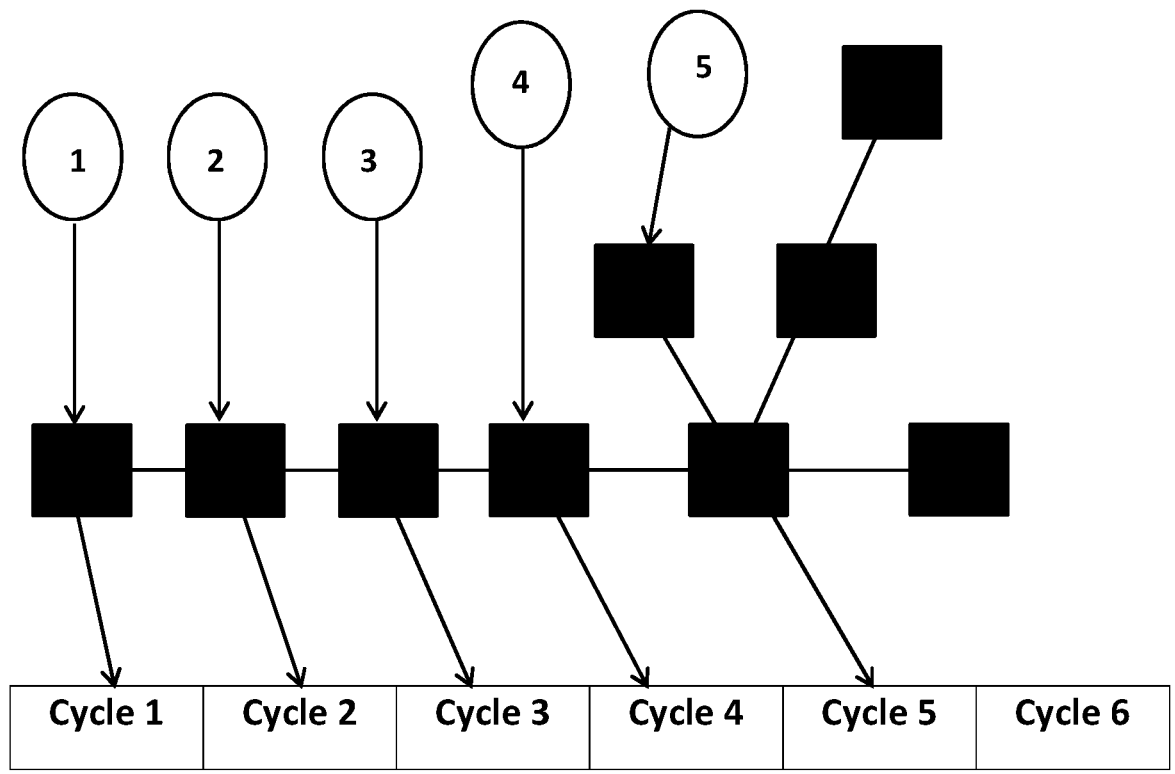
FIG. 10 illustrates an exemplary embodiment of configuration where devices configured to report in different cycles.

FIG. 10 illustrates an exemplary embodiment of a configuration where devices configured to report in different cycles. In the exemplary embodiment of the configuration device 1 is configured to report in cycle 1, device 2 is configured to report in cycle 2, device 3 is configured to report in cycle 3, device 4 is configured to report in cycle 4 and device 5 is configured to report in cycle 6. Such a configuration may be achieved by the first device sending a configuration to the second device, where the first device reports on cycle N and the configuration makes the second device to report on cycle N+1 modulo predefined, substantially predefined or random number.

Figure 11:
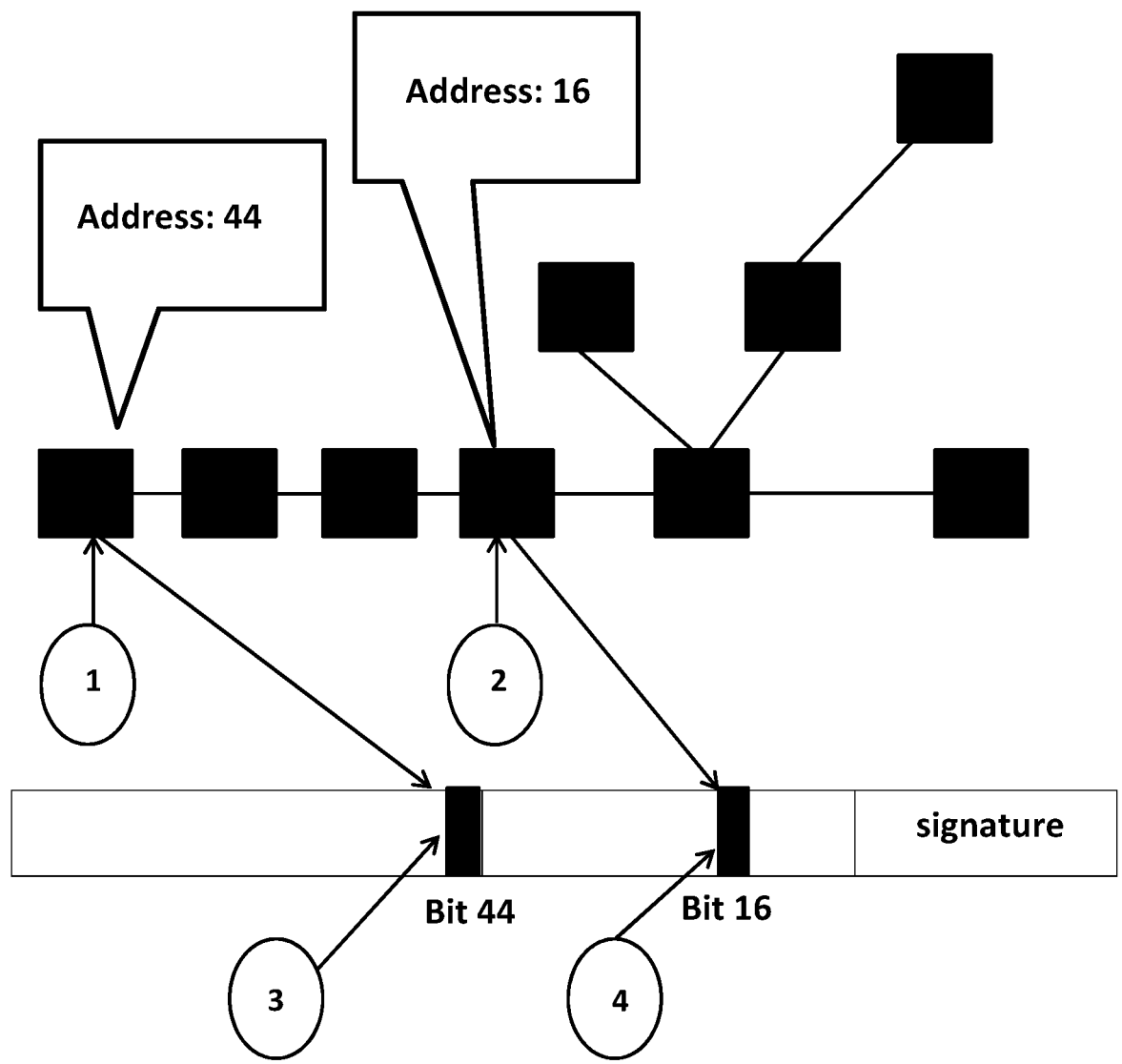
FIG. 11 depicts an exemplary embodiment of an acknowledgement packet.

FIG. 11 depicts an exemplary embodiment of an acknowledgement packet. Device 1 sets acknowledgement bit 3 and device 2 sets acknowledgement bit 4. The acknowledgement packet may be used to indicate received or not received command or data. Acknowledgement bit may be set when device receives a new command. A device that injected the command may reset the acknowledgement bit.

In certain embodiments, device injecting a command may retransmit the command until it's successfully acknowledged.

Adjacent Channel

Figure 12:
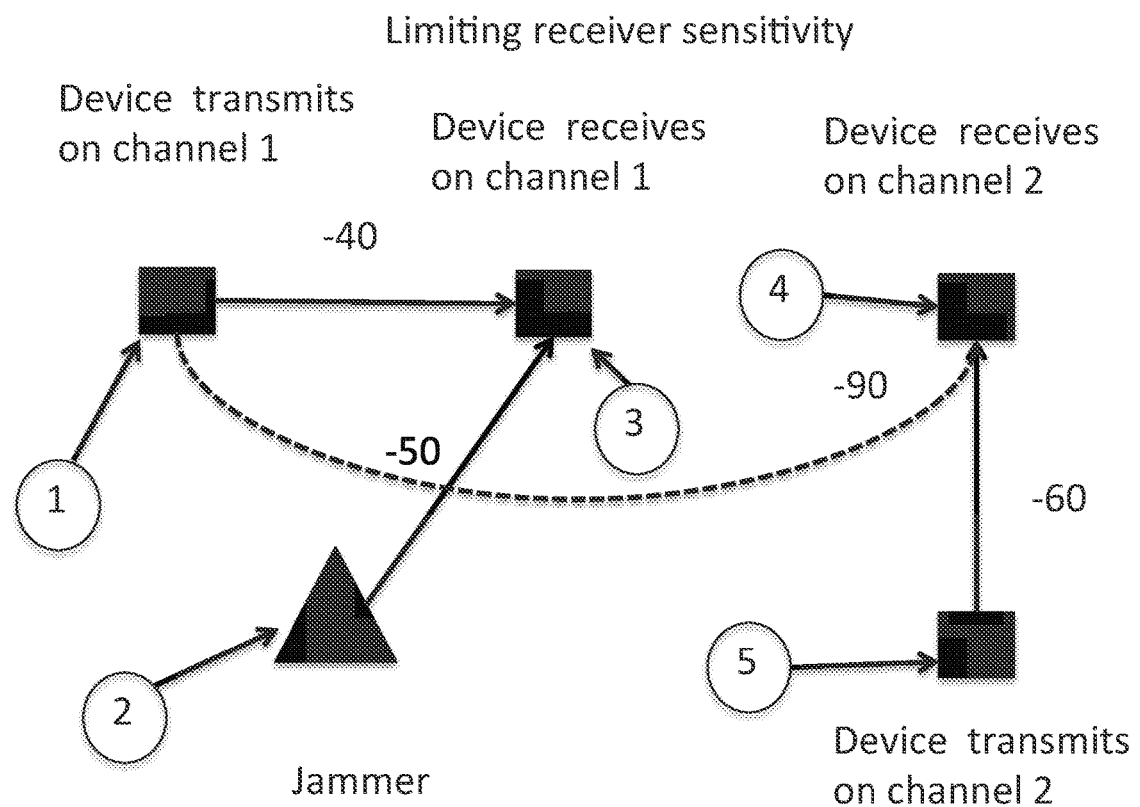
FIG. 12 depicts an exemplary embodiment of adjacent channel interference.

In certain embodiments, device may lower the RF sensitivity level. Lowering RF sensitivity level may be beneficial to substantially avoid adjacent channel interference. FIG. 12 depicts an exemplary embodiment of adjacent channel interference. In the exemplary embodiment, device 4 receives a transmission from device 5 with signal strength of −60 dBm. In the exemplary embodiment, device 4 receives a transmission from device 1 on an adjacent channel with signal strength of −90 dBm. If the transmission from device 1 is received prior or substantially prior to the transmission from device 5, device 4 may receive the transmission from device 1 and miss a transmission from device 5. In the exemplary embodiment, limiting device 4 sensitivity to −80 dBm may eliminate the adjacent channel jamming problem.

In certain embodiments, a synchronization preamble may be assigned to a first channel and the orthogonal preamble may be assigned to a second channel. This may solve the adjacent channel problem.

Exemplary Non Limiting Applications

In certain embodiments, a portion or substantial portion of a plurality of devices comprising a network may be acting as beacons (for example iBeacons) to determine micro location. In certain embodiments other methods may be employed to determine macro-location and beacons may be used to determine micro-location. Beacons may be synchronous to avoid mutual interference.

In certain embodiments, at least one tag may transmit a signal and a portion of a plurality of devices comprising a network may receive the signal and the signal strength may be used to determine the location of the at least one tag. Tags may be synchronous to avoid mutual interference.

In certain embodiments, devices may be LiFi access points and be interconnected through mesh network. Devices may use one or more of LiFi communication methods to communicate within the mesh network.

Devices and/or sensors that may be used with certain embodiments includes, for example, current sensors, light sensors, humidity sensors, pressure sensors, gas sensors, chemicals sensors, proximity sensors, movement sensors, magnetic (hall effect) sensors, radiation sensors, cameras, scanners, sprinkles, heater controllers, pump controllers, air-conditioning controllers, water supply controllers or combinations thereof. In certain embodiments of the disclosed technology, a device may perform multiply functions, for example, the device may include one of more of the following: measure something, control another device (using dry contacts, wired or wireless communication protocol), monitor something, report measured data back, report anomalies, accept and execute control commands.

Certain embodiments may involve controlling cameras, wherein one of the purposes may be 3D face and/or body recognition.

Certain embodiments may involve deploying sensors to monitor ice levels. Sensors may also be positioned at one or more of the following intervals: sufficient intervals, suitable intervals, and combinations of distances such as 5 m, 10 m, 30 m, 50 m, 200 m and 500 m. A network may have one or more gateways to transmit the information using other communication methods. Other communication methods may be one or more of the following: 3G, 4G, LTE, SatComm, WiFi, WiMax, Ethernet and optical cable.

Certain embodiments may involve deploying road markers. Road markers may be positioned at one or more of the following intervals: sufficient intervals, suitable intervals, and combinations of distances such as 1 m, 3 m, 5 m, 10 m, 30 m, 50 m, 200 m and 500 m.

Certain embodiments are directed to systems, methods and/or devices that may be used to manage energy usage related functions over an area that is being managed. In certain embodiments, at least a portion of the received data from a plurality of sensors may be used to perform one or more of the following: generate energy consumption reports, predict future energy usage of the area, create at least one computer generated behavioral patterns for the area, optimize environmental conditions of the area and learn about and/or create pattern of environmental preferences of occupants of the area.

Exemplary Non Limiting Lighting Control Example

Figure 15:
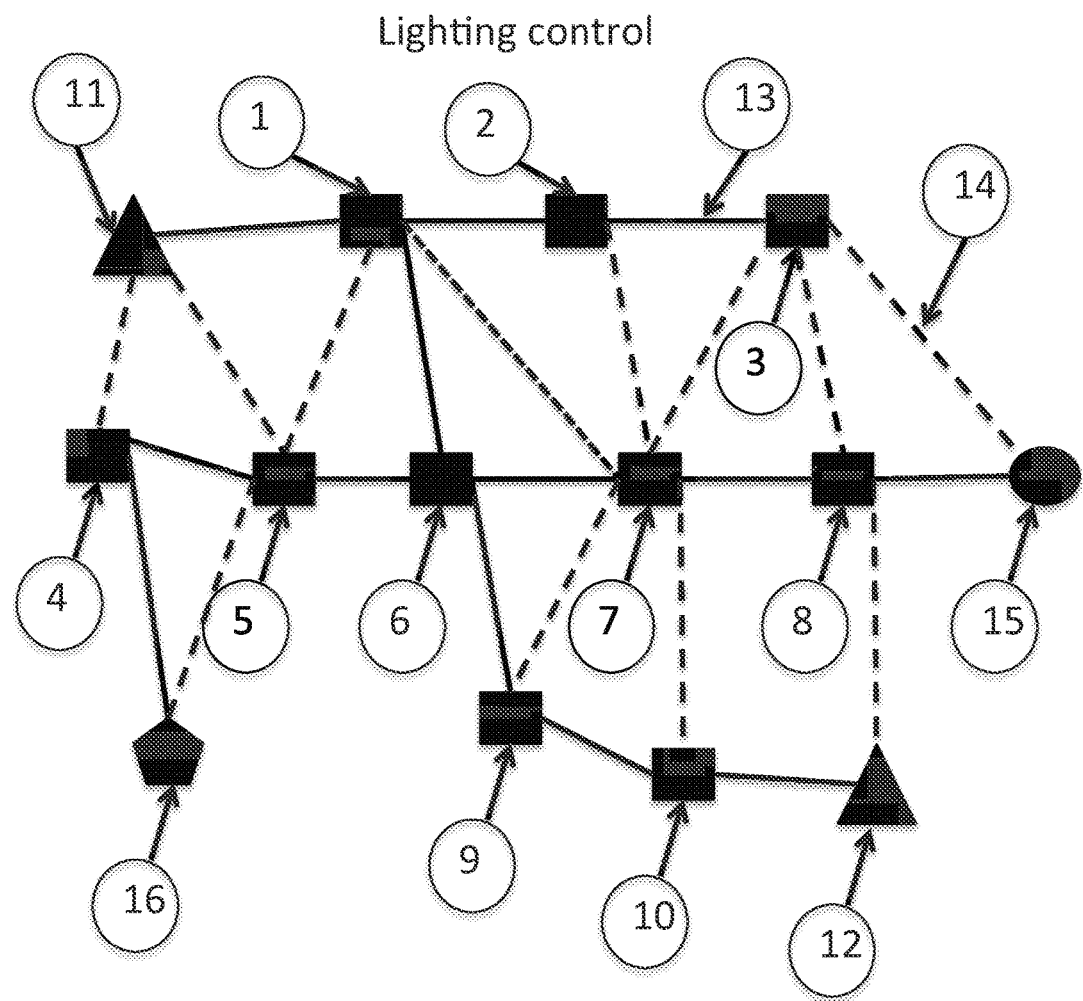
FIG. 15 depicts an exemplary embodiment of a wireless lighting control system.

FIG. 15 depicts an exemplary embodiment of a wireless lighting control system. The exemplary embodiment shows a plurality of lights with wireless controls 1 to 8, wireless switches 11 and 12, motion sensor 16 and wireless touch screen 15 comprising a network with a first route 13 and a second route 14.

In certain embodiments, switches and/or motion sensor may control at least a portion of a plurality of lights and cause the portion of the plurality of lights to perform one or more of the following actions: turn at least one light of the portion of the plurality of lights on, turn at least one light of the portion of the plurality of lights off, change the brightness of at least one light of the portion of the plurality of lights to a predefined level, change the colour temperature of at least one light of the portion of the plurality of lights to a predefined colour temperature and change the colour of at least one light of the portion of the plurality of lights to a predefined colour.

In certain embodiments, touch screen may control at least a portion of a plurality of lights and cause the portion of the plurality of lights to perform one or more of the following actions: turn at least one light of the portion of the plurality of lights on, turn at least one light of the portion of the plurality of lights off, change the brightness of at least one light of the portion of the plurality of lights, change the colour temperature of at least one light of the portion of the plurality of lights and change the colour of at least one light of the portion of the plurality of lights.

In certain embodiments, at least a portion of a plurality of lights may perform different actions at different times and/or days and/or days of the week.

In certain embodiments, touch screen can be used to program at least one function of at least a portion of a plurality of lights.

Figure 16:
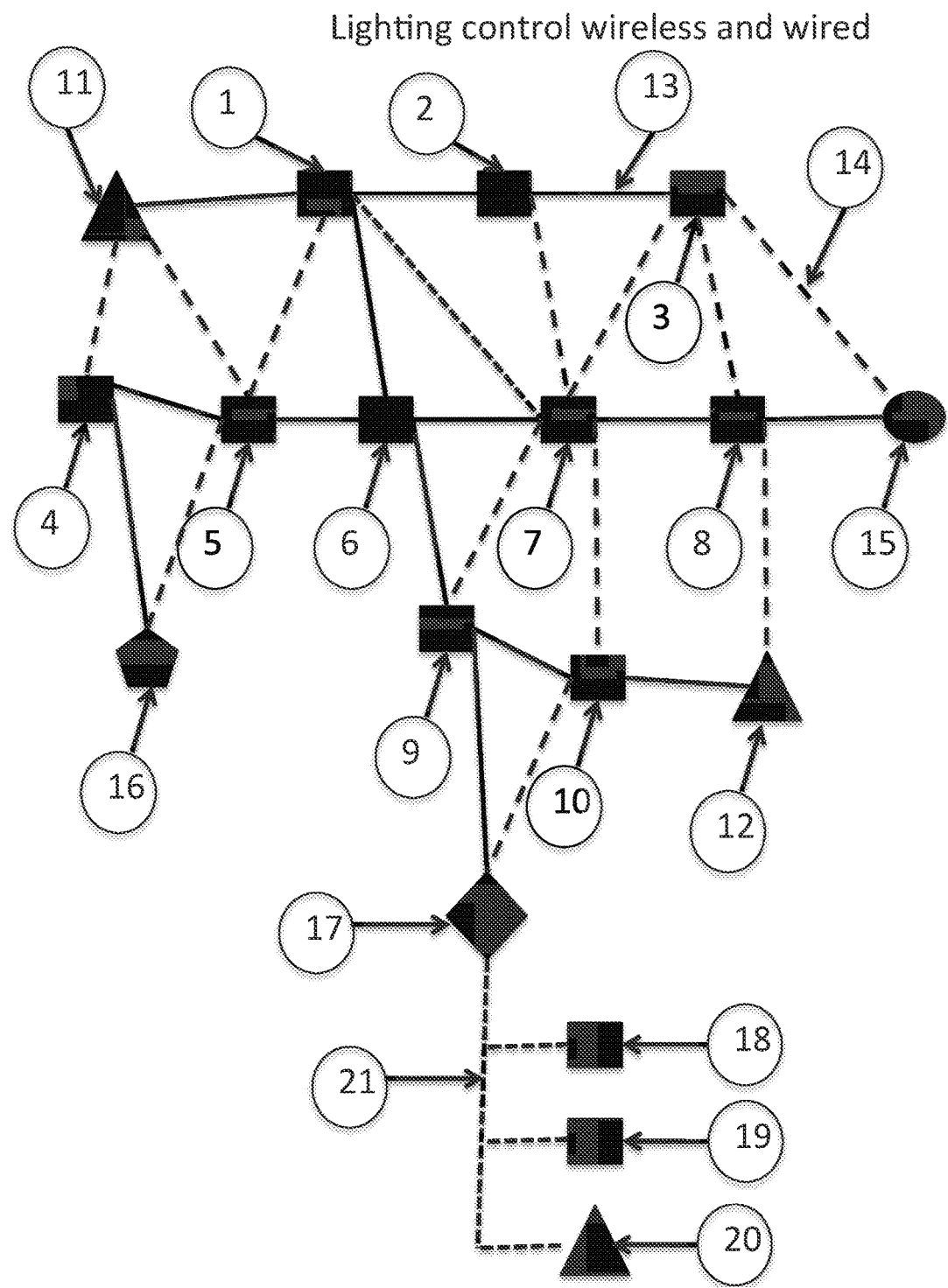
FIG. 16 depicts an exemplary embodiment of mixed wired and wireless lighting control system.

FIG. 16 depicts an exemplary embodiment of mixed wired and wireless lighting control system wherein the wireless lighting control system is based on at least one of the embodiments described herein. The exemplary embodiment shows a plurality of lights with wireless controls 1 to 8, wireless switches 11 and 12, motion sensor 16, wireless touch screen 15 and a gateway 17 comprising a network with a first route 13 and a second route 14. The exemplary embodiment shows wired control system comprised of gateway 17, lights 18 and 19 and switch 20.

In certain embodiments, wired control system may be one or more of the following: DALI, C-Bus, DSI, DMX, KNX and Modbus.

In certain embodiments, gateway may support one or more of the following: wireless system of one or more of the embodiments described herein, DALI, C-Bus, DSI, DMX, KNX, ZigBee, Z-wave and Modbus.

In certain embodiments, gateway may be connected to the cloud by one or more of the following means: Ethernet, WiFi, 3G modem, 4G modem, LTE modem, NB-LTE modem and SatComm modem.

In certain embodiments the lighting control may be one or more of the following: embedded into the light fitting, embedded into a light, embedded into a ballast, a module connected to the ballast and a module connected to the light. In certain embodiments the ballast may be one or more of the following: DALI, C-Bus and other ballast.

In certain embodiment light and/or light fitting may incorporate one or more of the following: motion sensor, temperature sensor, PIR sensor, current sensor and light sensor. In certain embodiment sensor data may be used for preventive maintenance.

Exemplary Non Limiting Asset Management and People Tracking Example

Figure 17:
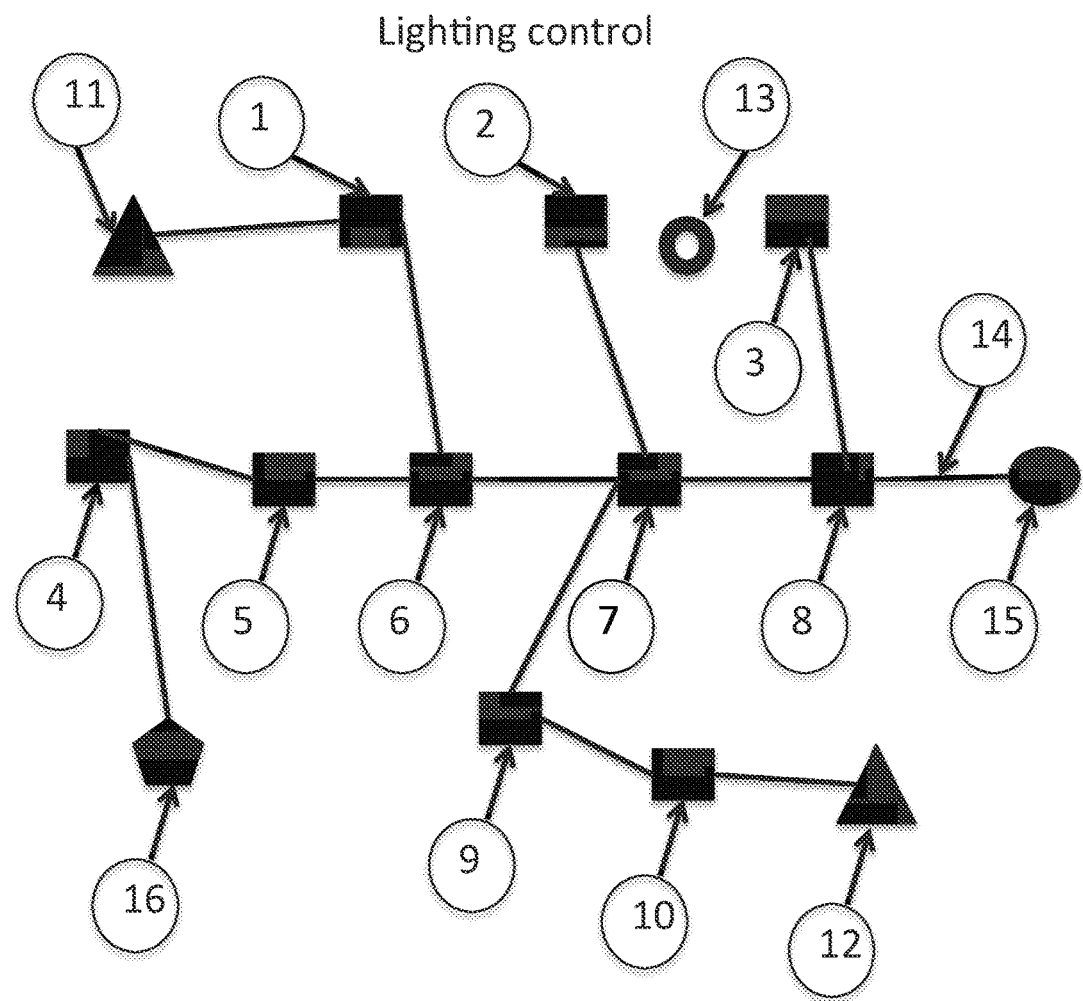
FIG. 17 depicts an exemplary embodiment of asset management system and/or people tracking system.

FIG. 17 depicts an exemplary embodiment of asset management system and/or people tracking system based on a wireless lighting control system. The exemplary embodiment shows a plurality of lights with wireless controls 1 to 8, wireless switches 11 and 12, motion sensor 16 and wireless touch screen 15 comprising a network with route 14. In the exemplary embodiment at least one light of the plurality of lights listens on at least one predefined channels, wherein the at least one predefined channel may be one or more of the following: Bluetooth channel, BLE channel, ZigBee channel and other RF channel. In the exemplary embodiment wireless tag 13 may transmit a packet. The packet may be transmitted at one or more times: periodically, randomly, at predefined times and during a predefined time interval. Wireless tag 13 may transmit the packet on at least one predefined channels, wherein the at least one predefined channel may be one or more of the following: Bluetooth channel, BLE channel, ZigBee channel and other RF channel. The packet may contain one or more of the following: identification number, short identification number, hash of identification number, battery level, URL, RFID address and preprogrammed number. The at least one light of the plurality of lights that listens on the at least one predefined channel may receive the packet and may record the signal strength of the received packet. The recorded signal strength may be used to determine tag location. Maximum signal strength may be used to determine tag location. The tag may be carried by at least one personnel.

In certain embodiments, RFID reader may be embedded in the light fittings and the tag may be RFID tag.

Exemplary Non Limiting Remote Site Monitoring Example

Figure 18:
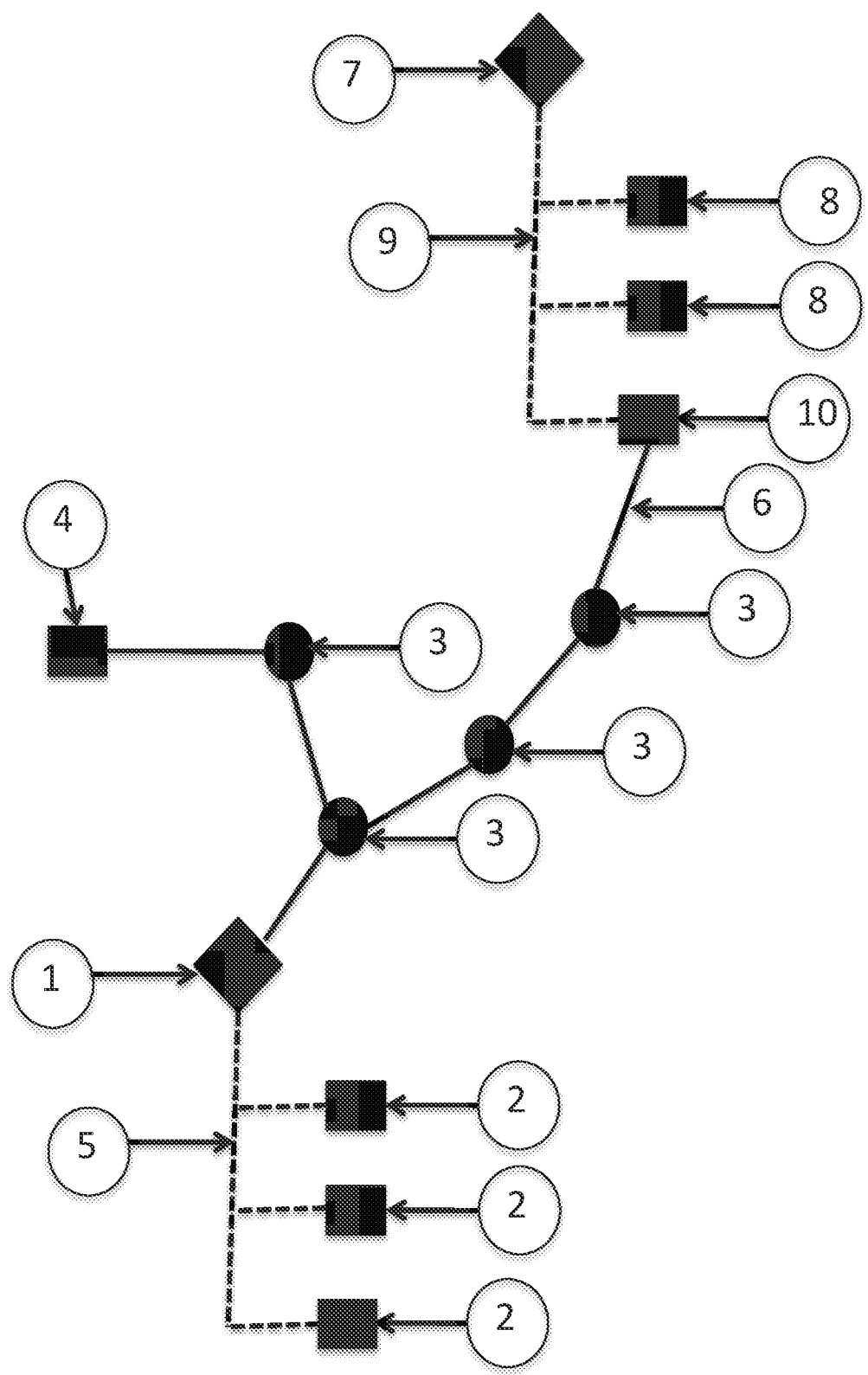
FIG. 18 depicts an exemplary embodiment of remote site monitoring.

FIG. 18 depicts an exemplary embodiment of remote site monitoring wherein equipment 1 and 2 are connected through a wired system 5 and equipment 7, 8 and 10 are connected through wired system 9; and wherein wireless devices 3, 4, 1 and 10. The wireless network may relay data between wired system 5 and wired system 9. Equipment 1 and/or 7 and/or 4 may be a gateway and may be connected to the cloud by one or more of the following means: Ethernet, WiFi, 3G modem, 4G modem, LTE modem, NB-LTE modem and SatComm modem.

Other Exemplary Non-Limiting Embodiments

Examples A

Example A1. A network system comprising a plurality of devices wherein a substantial portion of the plurality of devices are capable of one or more of the following: transmitting data and receiving data; wherein the distance between devices allows communication between at least one device and at least one other device; and wherein at least a portion of the plurality of devices comprising the network system configure themselves based on local network information.

A2. The network system of example A1, wherein the network has substantially no access points and substantially no routers; and wherein a substantial portion of the plurality of devices are synchronous in time.

A3. The network system of one or more of examples A1 and A2, wherein the substantial portion of the plurality devices are synchronous in time and the network is substantially internal interference free.

A4. The network system of one or more of examples A1 to A3, wherein at least one device from the plurality of devices stores previous configurations and the network build up time is one or more of the following: less than 10 minutes, less than 5 minutes, less than 1 minute, less than 30 seconds, less than 10 seconds, less than 5 seconds, less than 1 second, less than 100 msec, less than 50 msec and less than 10 msec.

A5. The network system of one or more of examples A1 to A4, wherein the number of devices is N; wherein at least one device from the plurality of devices comprising the network system stores previous configurations and the network build up time is one or more of the following: less than 100*N seconds, less than 50*N seconds, less than 10*N seconds, less than N seconds, less than 0.5*N seconds, less than 0.1*N seconds, less than 0.01*N seconds and less than 0.001*N seconds.

A6. The network system of one or more of examples A1 to A5, wherein at least one device from the plurality of devices dynamically adjusts packet error rate and/or message error rate through repeat timeslots and/or modulation and/or alternative routes.

A7. The network systems of one or more of examples A1 to A6, wherein a substantial portion of the plurality of devices comprising at least one adjacent network are synchronized in time.

A8. The network system of one or more of examples A1 to A7, wherein at least one device from the plurality of devices comprising the network system estimates crystal drift.

A9. The network system of one or more of examples A1 to A8, wherein at least one device from the plurality of devices comprising the network system has multiple group and/or application encryption and/or decryption keys; and wherein at least one device from the plurality of devices comprising the network system decides which application a packet belongs to by successfully matching a signature of the packet.

Examples B

B1. A network system comprising a plurality of devices wherein a substantial portion of the plurality of devices are capable of one or more of the following: transmitting data and receiving data; wherein the distance between devices allows communication between at least one device and at least one other device; and wherein the substantial portion of the plurality devices comprising the network are synchronous in time and the network is substantially internal interference free.

B2. The network system of the example B1, wherein at least a portion of the plurality of devices configure themselves based on local network information.

B3. The network system of one or more of examples B1 and B2, wherein the network has substantially no access points and substantially no routers; and wherein a substantial portion of the plurality of devices are synchronous in time.

B4. The network system of one or more of examples B1 to B3, wherein at least one device from the plurality of devices stores previous configurations and the network build up time is one or more of the following: less than 10 minutes, less than 5 minutes, less than 1 minute, less than 30 seconds, less than 10 seconds, less than 5 seconds, less than 1 second, less than 100 msec, less than 50 msec and less than 10 msec.

B5. The network system of one or more of examples B1 to B4, wherein the number of devices comprising the network is N; wherein at least one device from the plurality of devices comprising the network system stores previous configurations and the network build up time is one or more of the following: less than 100*N seconds, less than 50*N seconds, less than 10*N seconds, less than N seconds, less than 0.5*N seconds, less than 0.1*N seconds, less than 0.01*N seconds and less than 0.001*N seconds, where the symbol "*" represents multiplication function.

B6. The network system of one or more of examples B1 to B5, wherein at least one device from the plurality of devices may dynamically adjust packet error rate and/or message error rate through repeat timeslots and/or modulation and/or alternative routes.

B7. The network systems of one or more of examples B1 to B6, wherein a substantial portion of a plurality of devices comprising at least one adjacent network may be synchronized in time.

B8. The network system of one or more of examples B1 to B7, wherein at least one device from a plurality of devices comprising the network system may estimate crystal drift.

B9. The network system of one or more of examples B1 to B8, wherein at least one device from the plurality of devices comprising the network system may have multiple group and/or application encryption and/or decryption keys; wherein the wherein at least one device from the plurality of devices comprising the network system may decide which application a packet belongs to by successfully matching a signature of the packet.

Examples C

C1. A method for configuring at least a portion of a plurality of devices to comprise a network based on local network information; wherein a substantial portion of the plurality of devices are capable of transmitting data and/or receiving data; and wherein the distance between devices allows communication between at least one device and at least one other device.

C2. The method of the example C1, wherein a substantial portion of the plurality of devices comprising the network is synchronous in time and the network is substantially internal interference free.

C3. The method of one or more of examples C1 and C2, wherein at least one device from the plurality of devices comprising the network system stores previous configurations and the network build up time is one or more of the following: less than 10 minutes, less than 5 minutes, less than 1 minute, less than 30 seconds, less than 10 seconds, less than 5 seconds, less than 1 second, less than 100 msec, less than 50 msec and less than 10 msec.

C4. The method of one or more of examples C1 to C3, wherein the number of devices comprising the network is N; wherein at least one device from the plurality of devices comprising the network system stores previous configurations and the network build up time is one or more of the following: less than 100*N seconds, less than 50*N seconds, less than 10*N seconds, less than N seconds, less than 0.5*N seconds, less than 0.1*N seconds, less than 0.01*N seconds and less than 0.001*N seconds, where the symbol "*" represents multiplication function.

C5. The method of one or more of the examples C1 to C4, for at least one device from the plurality of devices comprising the network system to dynamically adjust packet error rate and/or message error rate through repeat timeslots and/or modulation and/or alternative routes.

C6. The method of one or more of examples C1 to C5, wherein a substantial portion of a plurality of devices comprising at least one adjacent network may be synchronized in time.

C7. The method of one or more of examples C1 to C6, for at least one device from the plurality of devices comprising the network system to estimate crystal drift.

C8. The method of one or more of examples C1 to C7, for at least one device from the plurality of devices comprising the network system to decide which application the packet belongs to by successfully matching a signature of a packet; wherein the network system may have multiple group and/or application encryption and/or decryption keys.

The invention claimed is:

1. A network system comprising:
    a plurality of devices wherein a substantial portion of the plurality of devices are capable of one or more of the following: transmitting data and receiving data;
    wherein the distance between devices allows communication between at least one device and at least one other device;
    wherein at least a portion of the plurality of devices comprising the network system configure themselves based on local network information; and
    wherein at least one device from the plurality of devices stores previous configurations and the network build up time is one or more of the following: less than 10 minutes, less than 5 minutes, less than 1 minute, less than 30 seconds, less than 10 seconds, less than 5 seconds, less than 1 second, less than 100 msec, less than 50 msec and less than 10 msec.

2. The network system of claim 1, wherein the network has substantially no access points and substantially no routers; and wherein a substantial portion of the plurality of devices are synchronous in time.

3. The network system of claim 1, wherein the substantial portion of the plurality devices are synchronous in time and the network is substantially internal interference free.

4. The network system of claim 1, wherein the number of devices is N; wherein at least one device from the plurality of devices comprising the network system stores previous configurations and the network build up time is one or more of the following: less than 100*N seconds, less than 50*N seconds, less than 10*N seconds, less than N seconds, less than 0.5*N seconds, less than 0.1*N seconds, less than 0.01*N seconds and less than 0.001*N seconds.

5. The network system of claim 1, wherein at least one device from the plurality of devices dynamically adjusts packet error rate and/or message error rate through repeat timeslots and/or modulation and/or alternative routes.

6. The network systems of claim 1, wherein a substantial portion of the plurality of devices comprising at least one adjacent network are synchronized in time.

7. The network system of claim 1, wherein at least one device from the plurality of devices comprising the network system estimates crystal drift.

8. The network system of claim 1, wherein at least one device from the plurality of devices comprising the network system has multiple group and/or application encryption and/or decryption keys; and wherein at least one device from the plurality of devices comprising the network system decides which application a packet belongs to by successfully matching a signature of the packet.

9. A network system comprising:
    a plurality of devices wherein a substantial portion of the plurality of devices are capable of one or more of the following: transmitting data and receiving data;
    wherein the distance between devices allows communication between at least one device and at least one other device;
    wherein at least a portion of the plurality of devices comprising the network system configure themselves based on local network information;
    wherein the number of devices is N; and wherein at least one device from the plurality of devices comprising the network system stores previous configurations and the network build up time is one or more of the following: less than 100*N seconds, less than 50*N seconds, less than 10*N seconds, less than N seconds, less than 0.5*N seconds, less than 0.1*N seconds, less than 0.01*N seconds and less than 0.001*N seconds.

10. The network system of claim 9, wherein the network has substantially no access points and substantially no routers; and wherein a substantial portion of the plurality of devices are synchronous in time.

11. The network system of claim 10, wherein at least one device from the plurality of devices stores previous configurations and the network build up time is one or more of the following: less than 10 minutes, less than 5 minutes, less than 1 minute, less than 30 seconds, less than 10 seconds, less than 5 seconds, less than 1 second, less than 100 msec, less than 50 msec and less than 10 msec.

12. The network system of claim 9, wherein the substantial portion of the plurality devices are synchronous in time and the network is substantially internal interference free.

13. The network system of claim 9, wherein at least one device from the plurality of devices dynamically adjusts packet error rate and/or message error rate through repeat timeslots and/or modulation and/or alternative routes.

14. The network systems of claim 9, wherein a substantial portion of the plurality of devices comprising at least one adjacent network are synchronized in time.

15. The network system of claim 9, wherein at least one device from the plurality of devices comprising the network system estimates crystal drift.

16. The network system of claim 9, wherein at least one device from the plurality of devices comprising the network system has multiple group and/or application encryption and/or decryption keys; and wherein at least one device from the plurality of devices comprising the network system decides which application a packet belongs to by successfully matching a signature of the packet.

* * * * *